(12) United States Patent
Walker et al.

(10) Patent No.: US 12,160,264 B2
(45) Date of Patent: Dec. 3, 2024

(54) OPTICAL WIRELESS COMMUNICATION (OWC) UNIT

(71) Applicant: pureLiFi Limited, Edinburgh (GB)

(72) Inventors: Duncan John William Walker, Edinburgh (GB); Luca Carraro, Edinburgh (GB); Christopher Nigel Tate, Edinburgh (GB); Mostafa Zaman Afgani, Edinburgh (GB); Steven Alexander Richard Ritchie, Edinburgh (GB); Arne Rossius, Edinburgh (GB); Tamas Weszely, Edinburgh (GB); Istvan Phillipe Bernard Csajaghy, Edinburgh (GB)

(73) Assignee: pureLiFi Limited, Edinburgh (GB)

( * ) Notice: Subject to any disclaimer, the term of this patent is extended or adjusted under 35 U.S.C. 154(b) by 40 days.

(21) Appl. No.: 17/763,879

(22) PCT Filed: Sep. 28, 2020

(86) PCT No.: PCT/EP2020/077152
§ 371 (c)(1),
(2) Date: Mar. 25, 2022

(87) PCT Pub. No.: WO2021/058834
PCT Pub. Date: Apr. 1, 2021

(65) Prior Publication Data
US 2023/0344515 A1    Oct. 26, 2023

(30) Foreign Application Priority Data

Sep. 27, 2019 (GB) .................................. 1913977

(51) Int. Cl.
*H04B 10/114* (2013.01)
*H04B 10/116* (2013.01)

(52) U.S. Cl.
CPC ..... *H04B 10/1143* (2013.01); *H04B 10/1149* (2013.01); *H04B 10/116* (2013.01)

(58) Field of Classification Search
CPC .............. H04B 10/116; H04B 10/1143; H04B 10/1149
See application file for complete search history.

(56) References Cited

U.S. PATENT DOCUMENTS 6,944,402 B1 * 9/2005 Baker ................ H04B 10/1143
398/118
7,106,973 B2    9/2006 Kube et al.
(Continued)

FOREIGN PATENT DOCUMENTS

CN       1173494 C   * 10/2004
TW    201239435 A      10/2012
(Continued)

OTHER PUBLICATIONS

A. Ramli, "Optical Wireless Front-End Receiver Design", Dec. 2008, IEEE International Rf and Microwave Conference Proceedings, All pages (Year: 2008).*
(Continued)

*Primary Examiner* — Pranesh K Barua
(74) *Attorney, Agent, or Firm* — Myers Bigel, P.A.

(57) ABSTRACT

An optical wireless communication (OWC) unit for transmitting and/or receiving data installable in a further device comprises at least one transmitter device for transmitting modulated light comprising an OWC signal of said data and/or at least one receiver device for receiving modulated light comprising an OWC signal representative of said data, wherein the at least one receiver device comprises at least one detector. The OWC unit further comprises analogue electronic circuitry for processing electronic signals and at least one power connection and/or at least one data connection for connection to a power source and/or processing (Continued)

resource of the further device. The OWC unit is operable to provide OWC communication under control of said further device and/or so as to transmit data from/provide data to said further device. The OWC unit is for use in an OWC system having an analogue bandwidth greater than or equal to 80 MHz.

24 Claims, 13 Drawing Sheets

(56) References Cited

U.S. PATENT DOCUMENTS

| | | | |
|---|---|---|---|
| 7,453,058 B2 | 11/2008 | Lee et al. | |
| 9,386,668 B2 | 7/2016 | Knapp et al. | |
| 10,644,804 B1* | 5/2020 | Obeed | H04B 15/005 |
| 2007/0147843 A1* | 6/2007 | Fujiwara | H04B 10/116 |
| | | | 398/118 |
| 2012/0002976 A1* | 1/2012 | Gerber | F41G 3/2683 |
| | | | 398/140 |
| 2017/0195044 A1* | 7/2017 | Shatz | G02B 19/009 |
| 2019/0261470 A1* | 8/2019 | Wang | H04B 10/5162 |
| 2019/0280769 A1 | 9/2019 | Verbrugh | |
| 2022/0116111 A1* | 4/2022 | Zhang | H04B 10/11 |

FOREIGN PATENT DOCUMENTS

| | | |
|---|---|---|
| WO | 2019034838 A1 | 2/2019 |
| WO | 2019063964 A1 | 4/2019 |
| WO | 2020188290 A2 | 9/2020 |

OTHER PUBLICATIONS

"LiFi : Delivery of LiFi-compatible devices", Oledcomm, www.oledcomm.net/lifi-max/, Accessed Apr. 5, 2022, 7 pp.

PURELIFI, "Snapshot-At-a-Glance: Data Sheet", https://purelifi.com/wp-content/uploads/2017/12/LiFi-XC-Data-sheet-Snapshot.pdf, 2017, 2 pp.

Wei, Lei, et al., "Visible Light Communication—An alternative to the wireless transmission with RF spectrums through visible light communication", Final Paper Documentation, University of Central Florida Department of Electrical Engineering and Computer Science, 2017, 133 pp.

"International Search Report and Written Opinion of the International Searching Authority", International Application No. PCT/EP2020/077152, Jan. 11, 2021, 15 pp.

O'Brien, Dominic, et al., "High data-rate infra-red optical wireless communications: implementation challenges", IEEE Globecom 2010 Workshop on Optical Wireless Communications, Piscataway, NJ, Dec. 6, 2010, pp. 1047-1051.

Ramli, A., et al., "Optical Wireless Front-End Receiver Design", 2008 IEEE International RF and Microwave Conference Proceedings, Kuala Lumpur, Malaysia, Dec. 2, 2008, pp. 331-334.

* cited by examiner

OPTICAL WIRELESS COMMUNICATION (OWC) UNIT

CROSS-REFERENCE TO RELATED APPLICATIONS

The present application is a 35 U.S.C. § 371 national stage application of PCT Application No. PCT/EP2020/077152, filed Sep. 28, 2020, which itself claims priority to GB Patent Application No. 1913977.3, filed Sep. 27, 2019, the entire contents of both of which are incorporated herein by reference in their entireties. The above-referenced PCT Application was published in the English language as International Publication No. WO 2021/058834 A1 on Apr. 1, 2021.

FIELD

The present invention relates to an optical wireless communication system, for example a LiFi system.

BACKGROUND

It is known to provide wireless data communications by using light instead of radio frequencies to transmit and receive data wirelessly between devices. Data may be transmitted using light by modulating at least one property of the light, for example the intensity of the light. Methods that use light to transmit data wirelessly may be referred to as optical wireless communications (OWC) or light communications (LC). LiFi is one form of optical wireless communication.

In Optical Wireless Communication systems (for example, LiFi systems), usually a number of Access Points (APs) communicate with a number of Stations (STAs). Both the Access Points and the Stations may be full duplex devices, capable of transmitting and receiving communication data at the same time.

Wireless networks using visible light may in some circumstances allow a higher data capacity and greater energy efficiency than radio frequency wireless networks, and may also be used to replace point-to-point infrastructure in locations where conventional infrastructure does not exist or is too expensive to build. There is increasing demand for data rate for many applications, for example due to increases in video streaming and the use of large data sets.

There is increasing interest in, and application of, LiFi systems. For example, LiFi may be integrated into mobile devices such as smart phones and tablets. LiFi may be integrated into any device that forms part of, or interfaces with, the Internet of Things (IoT). Integration of LiFi into small and/or mobile devices may involve dealing with challenging space constraints, while also meeting desired performance standards.

SUMMARY

In a first aspect there is provided an optical wireless communication (OWC) unit for transmitting and/or receiving data installable in a further device and comprising a transmitter device for transmitting modulated light comprising an optical wireless communication signal of said data and/or a receiver device for receiving modulated light comprising an optical wireless communication signal representative of said data, wherein the OWC unit comprises at least one power connection and/or at least one data connection for connection to a power source and/or processing resource of the further device, the OWC unit being configured such that it is operable to provide OWC communication under control of said further device and/or so as to transmit data from/provide data to said further device, when said power connection and/or said data connection are connected to said power source and/or said processing resource.

The OWC unit may be for use in an OWC system having an analogue bandwidth of greater than 80 MHz, optionally greater than 300 MHz, further optionally greater than 1 GHz. The analogue bandwidth may be between 80 MHz and 2.5 GHz, optionally between 80 MHz and 1 GHz, further optionally between 300 MHz and 1 GHz. The analogue bandwidth may be a −3 dB bandwidth.

The OWC unit may have a maximum height of less than or equal to 20 mm, optionally less than or equal to 10 mm, optionally less than or equal to 7 mm, optionally less than or equal to 5 mm, optionally less than or equal to 3 mm, optionally less than or equal to 1 mm, optionally less than or equal to 0.5 mm.

A height of the OWC unit may be between 1 mm and 20 mm, optionally between 3 mm and 20 mm, further optionally between 5 mm and 20 mm, further optionally between 7 mm and 20 mm, further optionally between 10 mm and 20 mm. A height of the OWC unit may be between 1 mm and 10 mm, optionally between 3 mm and 10 mm, further optionally between 5 mm and 10 mm.

The OWC unit may have a maximum length of less than or equal to 20 mm, optionally less than or equal to 15 mm, optionally less than or equal to 10 mm, optionally less than or equal to 5 mm, optionally less than or equal to 2 mm.

A length of the OWC unit may be between 1 mm and 20 mm, optionally between 3 mm and 20 mm, further optionally between 5 mm and 20 mm, further optionally between 7 mm and 20 mm, further optionally between 10 mm and 20 mm. A height of the OWC unit may be between 1 mm and 10 mm, optionally between 3 mm and 10 mm, further optionally between 5 mm and 10 mm.

The OWC unit may have a maximum width of less than or equal to 20 mm, optionally less than or equal to 15 mm, optionally less than or equal to 10 mm, optionally less than or equal to 5 mm, optionally less than or equal to 2 mm.

A width of the OWC unit may be between 1 mm and 20 mm, optionally between 3 mm and 20 mm, further optionally between 5 mm and 20 mm, further optionally between 7 mm and 20 mm, further optionally between 10 mm and 20 mm. A height of the OWC unit may be between 1 mm and 10 mm, optionally between 3 mm and 10 mm, further optionally between 5 mm and 10 mm.

A volume of the OWC unit may be between 3 mm$^3$ and 1000 mm$^3$, optionally between 50 mm$^3$ and 1000 mm$^3$, further optionally between 50 mm$^3$ and 100 mm$^3$. Dimensions of the unit may be 10×7×5 mm. Dimensions of the unit may be 12×6×1 mm. Dimensions of the unit may be 10×10×4.5 mm.

The OWC unit may be installable within a housing of said further device.

The further device may comprise a mobile device. The further device may comprise at least one of a mobile telephone, a tablet device, a laptop computer.

The further device may comprise at least one of a smart device, Internet of Things (IoT) device or luminaire.

The OWC communication may comprise LiFi communication. The OWC communication may be full-duplex and/or half-duplex and/or simplex.

The OWC unit may comprise at least one further component. The at least one further component may comprise at least one or more of, optionally each of: at least one light collector, at least one light filter, at least one light focusing element, at least one light defocusing element, at least one lens, at least one light diffusor, at least one telescope, at least one micro-optic element, at least one mirror, a current source, voltage generation circuitry, analogue electronic circuitry for processing electronic signals received from said detector device and/or electronic signals to be provided to said transmitter device.

The analogue electronic circuitry may comprise at least one or more of: at least one summer circuit, at least one transimpedance amplifier (TIA), at least one amplifier (optionally a voltage gain amplifier (VGA)), at least one automatic gain controller (AGC), at least one feedback electronic, at least one driver (optionally a linear driver), at least one filter (optionally a low pass filter).

At least one analogue electronic circuitry may be incorporated into an application specific integrated circuit (ASIC).

The current source may comprise at least one voltage converter, optionally a high voltage converter, optionally converting greater than 30V to less than 5V.

The OWC unit may comprise a single circuit carrier structure (optionally a single circuit board or a single integrated silicon package), or two circuit carrier structures (optionally two circuit boards or two integrated silicon packages), or more than two circuit carrier structures (optionally more than two circuit boards or more than two integrated silicon packages). The OWC device may comprise a plurality of circuit carrier structures (optionally a plurality of circuit boards or a plurality of integrated silicon packages).

The or each circuit carrier structure may comprise a printed circuit board (PCB).

The at least one further component and/or the transmitter device and/or the receiver device may be provided on said single circuit carrier structure or, variously, on said two circuit carrier structures. Each component may be provided on the circuit carrier structure or a respective one of the circuit carrier structures. The providing of a component on a circuit carrier structure may comprise mounting said component either directly to the circuit carrier structure or mounting said component to a further one or more components that are provided on the circuit carrier structure (e.g. said component may be provided on the circuit carrier structure indirectly).

The receiver device may be arranged in a stacked arrangement with at least one or more of said further components. The stacked arrangement may be such that said at least one or more of the components are located beneath the receiver device and above the circuit carrier structure, or at least one of the circuit carrier structures, on which they are provided.

The transmitter device may be arranged in a stacked arrangement with at least one or more of said further components. The stacked arrangement may be such that said at least one or more of the components are located beneath the transmitter device and above the circuit carrier structure or one of the circuit carrier structures on which they are provided.

References to above and below in connection with the receiver device, the transmitter device and said at least one further component may be defined, for example, in relation to the circuit carrier structure on which said receiver device, transmitter device and said at least one further component may be provided, and/or in relation to a transmission direction or optical axis of the transmitter device or reception direction or optical axis of the transmitter device, and/or in relation to a substantially planar face or surface of the OWC unit. It may be understood that in operation the OWC unit may, for example, have any desired orientation with respect to the earth's surface and gravitational field and that said orientation may vary.

The receiver device may comprise at least one detector. The or each detector may comprise a large area detector. The large area detector may have an area greater than 10 mm$^2$. The or each detector may comprise an array of detector elements. The or each detector may comprise at least one photodiode, array of photodiodes, Si PIN photodiode, silicon photomultiplier (SiPM), single photon avalanche diode (SPAD), Graphene-CMOS high-resolution sensor or avalanche photodiode (APD). The or each detector may have internal gain. The or each detector may be configured to receive modulated light comprising optical wireless communication signals and to generate electrical signals corresponding to the modulated light comprising optical wireless communication signals.

The or each detector may be configured to detect infra-red light and/or visible light and/or ultra-violet light and/or any wavelength(s) of light suitable for OWC communication. The OWC communication may comprise LiFi communication. The OWC receiver device may comprise or form part of an OWC transceiver device comprising OWC transmitter(s) and receiver(s). The or each receiver device may comprise or form part of an OWC transceiver.

At least some of said further components may comprise or form part of a receiver chain that is configured to process electrical signals from the detector.

The receiver device may be arranged in a stacked arrangement such at least one or more of the components of the receiver chain are arranged beneath the at least one detector. The receiver device may be arranged such that at least one or more further components of the receiver chain and/or at least some other of the further components of the unit are arranged side-by-side with the at least one detector or with components beneath the detector. Said at least one or more further components of the receiver chain and/or said at least some other of the further components of the unit may be offset laterally from said at least one detector.

The receiver device may be arranged in a stacked arrangement such that a dimension, optionally height, of at least some, optionally each, of the component(s) positioned side-by-side or offset laterally with respect to the at least one detector are greater than said dimension of at least some, optionally each, of the component(s) positioned beneath the at least one detector (and, optionally, above the at least one circuit carrier structure).

The one or more components positioned beneath the at least one detector may comprise at least one, optionally each, of: at least one application specific integrated circuit (ASIC), optionally an analogue ASIC; at least one capacitor; an integrated circuit (IC), optionally a high voltage IC.

The component(s) positioned side-by-side or offset laterally with respect to the at least one detector may comprise at least one, optionally each, of: the transmitter device or at least some components of the transmitter device; at least one inductor; at least one capacitor; at least one application specific integrated circuit (ASIC), optionally an analogue ASIC.

At least one or more of the further components may be optical components and may be arranged above the at least one detector. Said optical components may comprise, for example, at least one light collector, at least one light filter, at least one light focusing element, at least one light defocusing element and/or at least one light concentrator.

The receiver device may comprise at least one detector and at least one associated optical component. Said at least one associated optical component may be configured so that, in operation, light received by the at least one detector is transmitted or reflected or otherwise interacts with said at least one associated optical component before detection by the at least one detector.

The at least one associated optical component may comprise at least one light collector, at least one light filter, at least one light focusing element, at least one light defocusing element and/or at least one light concentrator. The at least one associated optical component may have small optical gain.

The at least one associated optical component may comprise at least one non-imaging optical element and/or the at least one light detector may be located away from a focal plane (if any) of the at least one associated optical component.

The at least one detector may comprise a first at least one detector, or array of detectors, configured to detect light of a first wavelength or range of wavelengths, and a second at least one detector, or array of detectors, configured to detect light of a second wavelength or range of wavelengths.

The first at least one detector, or array of detectors, may be configured to detect light of the first wavelength or range of wavelengths by way of a first filter selective of the first wavelength or range of wavelengths and positioned relative to the first at least one detector, or array of detectors.

The second at least one detector, or array of detectors, may be configured to detect light of the second wavelength or range of wavelengths by way of a second filter selective of the second wavelength or range of wavelengths and positioned relative to the second at least one detector, or array of detectors.

The first at least one detector, or array of detectors, and the second at least one detector, or array of detectors, may have substantially the same sensitivity profile as each other in the absence of the first and second filters.

The first at least one detector, or array of detectors, and the second at least one detector, or array of detectors, may be arranged in a side-by-side arrangement. The first filter and second filter may be arranged in a side-by-side arrangement. The first array of detectors and the second array of detectors may comprise smaller sub-arrays of a larger array.

The at least one detector may comprise further detectors or arrays of detectors and/or associated further filters, responsive to further different wavelengths or ranges of wavelengths.

The at least one filter may comprise at least one bandpass filter. The or each filter may be an angle-independent filter such that filtering to select desired wavelength(s) is substantially independent of an angle between the received light and the filter or a plane of the filter.

The or each filter may comprise a thin-film filter. The or each filter may have a thickness less than or equal to 100 µm, optionally less than or equal to 50 µm. The or each filter may have a thickness between 1 µm and 100 µm, optionally between 5 µm and 100 µm, further optionally between 10 µm and 50 µm.

The or each filter may comprise a dual wavelength filter operable to select light of two, or more, wavelengths or ranges of wavelengths.

The or each filter may comprise a plasmonic filter.

The or each filter may be formed directly on (for example, coated or otherwise deposited on) an associated detector and/or concentrator and/or other optical element.

The receiver device may comprise optical and/or electromagnetic shielding between and/or surrounding at least some of the detectors or arrays of detectors.

The transmitter device may comprise at least one emitter. The or each emitter may comprise an array of emitter elements.

The or each emitter may comprise a light source, optionally a light emitting diode (LED), an array of LEDS, a laser, for example a VCSEL (vertical-cavity surface-emitting laser), a VCSEL array, or a laser diode (optionally a side emitter laser diode) or an LEP (light-emitting plasma). The or each emitter may be configured to transmit infra-red light and/or visible light and/or ultra-violet light and/or any wavelength(s) of light suitable for OWC communication. The OWC communication may comprise LiFi communication. The OWC communication may be full-duplex and/or half-duplex and/or simplex. The OWC transmitter device may comprise or form part of an OWC transceiver device comprising OWC transmitter(s) and receiver(s). The or each transmitter device may comprise or form part of an OWC transceiver.

The emitter may be driven by a current source. The current source may be largely linear over the frequency range of operation of OWC transmission and the current range that is provided to the emitter. The deviation in the current provided to the emitter may be less than 1 dB.

At least some of said further components may comprise or form part of a transmitter chain that is configured to process electrical signals from the at least one emitter.

The transmitter device may be arranged in a stacked arrangement such at least one or more of the components of the transmitter chain are arranged beneath the at least one emitter. The transmitter device may be arranged such that at least one or more further components of the transmitter chain and/or at least some other of the further components of the unit are arranged side-by-side with the at least one emitter or with components beneath the at least one emitter. Said at least one or more further components of the transmitter chain and/or said at least some other of the further components of the unit may be offset laterally from said at least one emitter.

The transmitter device may be arranged in a stacked arrangement such that a dimension, optionally height, of at least some, optionally each, of the component(s) positioned side-by-side or offset laterally with respect to the at least one emitter are greater than said dimension of at least some, optionally each, of the component(s) positioned beneath the at least one emitter (and, optionally, above the at least one circuit carrier structure).

The one or more components positioned beneath the at least one emitter may comprise at least one, optionally each, of: at least one application specific integrated circuit (ASIC), optionally an analogue ASIC; at least one capacitor; an integrated circuit (IC), optionally a high voltage IC.

The component(s) positioned side-by-side or offset laterally with respect to the at least one emitter may comprise at least one, optionally each, of: the receiver device or at least some components of the receiver device; at least one inductor; at least one capacitor; at least one application specific integrated circuit (ASIC), optionally an analogue ASIC.

At least some of the further components may be optical components and may be arranged above the at least one emitter. Said optical components may comprise, for example, at least one light filter, at least one light focusing element, at least one light defocusing element, at least one diffuser, and/or at least one telescope and/or at least one micro-optic element. The diffuser and/or at least one telescope and/or other optical component may be configured such that an eye of a user is prevented from getting closer than a threshold distance from the emitter(s) and/or such that an amplitude or other parameter of light (for example power per unit area) from the emitter(s) is below a threshold level after the light passes through the diffuser and/or at least one telescope and/or other optical component.

The threshold level may comprise or be dependent on or be offset from an eye safe level. The diffuser and/or at least one telescope and/or other optical component may be configured to reduce an amplitude or other parameter of light (for example power per unit area) from the emitter(s) by a selected proportion or amount.

A dimension, optionally height, of a combination of the diffuser and/or at least one telescope and/or other optical component and/or one or more further components located beneath the at least one emitter and above the circuit carrier structure, or at least one of the circuit carrier structures, may be the same as a dimension, optionally height, of a combination of the receiver device and at least one component located beneath the at least one emitter and above the circuit carrier structure, or at least one of the circuit carrier structures.

The emitter device may comprise optical and/or electromagnetic shielding between and/or surrounding at least some of the emitters or arrays of emitters.

The OWC unit may comprise optical and/or electromagnetic shielding between the emitter device and the receiver device.

The unit may comprise a controller for controlling operation of the transmitter device and/or the receiver device.

The circuit carrier structure or at least one of the circuit carrier structures may comprise a double-sided circuit carrier structure or multi-layer circuit carrier structure, wherein at least some of the components of the unit may be provided on a first side of said circuit carrier structure and at least some of the components of the unit may be provided on a second, opposite side of said circuit carrier structure.

Each of the first and second sides of the at least one double-sided circuit carrier structure or multi-layer circuit carrier structure may comprise electrical connections, for example for connecting to one or more of the components. The electrical connections may comprise or form part of electrically conductive layer(s), for example copper layer(s).

At least some, optionally all, of the optical components (for example, one or more of the detector(s), concentrator(s), filter(s), emitter(s), diffuser(s) or any other optical component(s)) of or associated with the transmitter device and/or receiver device may be provided on the first side of the circuit carrier structure and at least some electrical components (optionally one or more of analogue ASIC(s), control electronics, power electronics, capacitor(s), inductor(s) and/or other passive electrical components) may be provided on the second side of the circuit carrier structure.

The components may comprise or be in the form of surface mounted technology (SMT) components.

The double-sided circuit carrier structure or multi-layer circuit carrier structure may comprise tracks and/or vias to provide connection, for example electrical and/or optical connection, between the first side and the second side and/or between component(s) on the first side and component(s) on the second side.

The at least one circuit carrier structure may comprise a plurality of circuit carrier structures, optionally at least one of the plurality of circuit carrier structures may comprise a double-sided circuit carrier structure or multi-layer circuit carrier structure. The plurality of circuit carrier structures may comprise a plurality of double sided circuit carrier structures or multi-layer circuit carrier structures.

The plurality of circuit carrier structures may be arranged in a stacked arrangement with one of the circuit carrier structures arranged above at least one of the other circuit carrier structures. The plurality of circuit carrier structures may be arranged in a stacked arrangement with one of the circuit carrier structures arranged above at least one of the other circuit carrier structures.

The plurality of circuit carrier structures may be arranged in a side-by-side arrangement and/or an angled arrangement. In the angled arrangement at least one of the circuit carrier structures may be arranged at an angle other than 0 degrees, optionally an angle substantially equal to 90 degrees, with respect to at least one other of the circuit carrier structures.

The plurality of circuit carrier structures may comprise a first one of the circuit carrier structures above a second one of the circuit carrier structures.

At least some of the components of the unit may be provided on a first, top side of the first circuit carrier structure and at least some of the components of the unit may be provided on a second, bottom side of the first circuit carrier structure.

At least some of the components of the unit may be provided on a first, top side of the second circuit carrier structure and at least some of the components of the unit may be provided on a second, bottom side of the second circuit carrier structure.

At least some, optionally all, of the optical components (for example, one or more of the detector(s), concentrator(s), filter(s), emitter(s), diffuser(s) or any other optical component(s)) of or associated with the transmitter device and/or receiver device may be provided on the top side of the first circuit carrier structure. At least some electrical components (optionally one or more of analogue ASIC(s), control electronics, power electronics, capacitor(s), inductor(s) and/or other passive electrical components) may be provided on the bottom side of the first circuit carrier structure.

At least some electrical components may be provided on the top and/or bottom side of the second circuit carrier structure.

Receiver filters, optics and/or detectors and/or transmitter diffusers, optics and light source may be provided on the top side of the first circuit carrier structure.

Control electronics, for example an analogue ASIC, may be provided on the top side of the first circuit carrier structure. A connector to external circuitry may be connected to both the bottom side of the first circuit carrier structure and the top side of the second circuit carrier structure. Power electronics, for example a high voltage IC, may be provided on the bottom side of the second circuit carrier structure. Tracks and/or vias may be used for electrical communication between components. Configuration of these tracks and/or vias may be such as to reduce interference between receiver and transmitter components.

The two or more stacked and/or double-sided circuit carrier structures may be connected, optionally at one edge by a connector, optionally a flex cable.

The components may comprise or be in the form of surface mounted technology (SMT) components.

The or each double-sided circuit carrier structure or multi-layer circuit carrier structure may comprise tracks and/or vias to provide connection, for example electrical and/or optical connection, between the first side and the second side and/or between component(s) on the first side and component(s) on the second side and/or between different layers.

The or each circuit carrier structure may comprise a multilayer semiconductor structure, optionally a multilayer silicon semiconductor structure. At least some of the components, optionally any suitable ones of the components, may be formed or deposited in the layers of the multilayer semiconductor structure.

Any suitable semiconductor device fabrication techniques may be used to form the electrical or optical component(s) in the multilayer semiconductor structure(s). Alternatively or additionally at least some of the electrical or optical component(s) may be mounted on the at least one multilayer semiconductor structure.

In some aspects or embodiments, any one or more of the circuit carrier structures as recited herein may instead be in the form of a multilayer semiconductor structure The unit may comprise an outer housing and at least some, optionally all, of the components of the unit may be within the outer housing. The unit may comprise an encapsulation material, for example epoxy, to encapsulate at least some, optionally all, of the components of the unit.

The unit may comprise, or be configured to connect to, conditioning circuitry configured to receive at least one signal, for example from a baseband device, and process the at least one signal to produce at least one conditioned signal representative of data stream(s) and suitable for transmission using the at least one transmitter device.

The baseband device may comprise a MIMO baseband device. The baseband device may comprise a baseband device intended for use with radio-frequency (RF) transmission circuitry. The baseband device may comprise a device operating in accordance with the 802.11 standard. The baseband device may comprise a baseband device and an RF integrated circuit.

The MIMO baseband device may process a plurality of signals to produce at least one conditioned signal representative of data stream(s) and suitable for transmission using the at least one transmitter device.

The at least one conditioned signal may comprise at least one baseband signal and/or at least one intermediate frequency between baseband and RF. The light representative of the data stream(s) may comprise at least one baseband signal and may comprise at least one intermediate frequency signal. Alternatively or additionally, the at least one conditioned signal may have a respective frequency and may represent its respective data stream by modulation in a frequency band close to 0 Hz.

The conditioning circuitry may be configured to perform at least one frequency conversion process. The at least one frequency conversion process may comprise a plurality of frequency conversion processes, for example conversion from (or to) RF to (from) baseband, optionally with conversion from (or to) RF to an intermediate frequency and then from (or to) baseband.

The frequency conversion process may comprise conversion from RF to baseband, optionally with conversion from RF to an intermediate frequency and then to baseband. The frequency conversion process may comprise conversion from baseband to RF, optionally with conversion from baseband to an intermediate frequency and then to RF.

The unit may comprise, or be configured to connect to, further conditioning circuitry configured to receive a plurality of signals from the at least one receiver device and process the plurality of signals to produce at least one conditioned signal representative of data stream(s).

The at least one conditioned signal may comprise at least one baseband signal and/or at least one intermediate frequency between baseband and RF. The light representative of the data stream(s) may comprise at least one baseband signal and may comprise at least one intermediate frequency signal. Alternatively or additionally, the at least one conditioned signal may have a respective frequency and may represent its respective data stream by modulation in a frequency band close to 0 Hz.

The further conditioning circuitry may be configured to perform at least one frequency conversion process. The at least one frequency conversion process may comprise a plurality of frequency conversion processes, for example conversion from (or to) RF to (from) baseband, optionally with conversion from (or to) RF to an intermediate frequency and then from (or to) baseband.

The frequency conversion process may comprise conversion from RF to baseband, optionally with conversion from RF to an intermediate frequency and then to baseband. The frequency conversion process may comprise conversion from baseband to RF, optionally with conversion from baseband to an intermediate frequency and then to RF. In a further aspect, there is provided a method of adapting an apparatus for OWC communication, comprising installing an OWC unit according to the first aspect in or on the apparatus.

In a further aspect, which may be provided independently, there is provided an optical wireless communication (OWC) unit for transmitting and/or receiving data installable in a further device and comprising: at least one transmitter device for transmitting modulated light comprising an optical wireless communication signal of said data and/or at least one receiver device for receiving modulated light comprising an optical wireless communication signal representative of said data, wherein the at least one receiver device comprises at least one detector, wherein the or each detector is configured to receive modulated light comprising optical wireless communication signals and to generate electrical signals corresponding to the modulated light comprising optical wireless communication signals; the OWC unit further comprising: analogue electronic circuitry for processing electronic signals received from said at least one detector and/or electronic signals to be provided to said at least one transmitter device; and at least one power connection and/or at least one data connection for connection to a power source and/or processing resource of the further device, the OWC unit being configured such that it is operable to provide OWC communication under control of said further device and/or so as to transmit data from/provide data to said further device, when said power connection and/or said data connection are connected to said power source and/or said processing resource; wherein the OWC unit is for use in an optical wireless communication system having an analogue bandwidth greater than or equal to 80 MHz.

The analogue bandwidth may be greater than 300 MHz, further optionally greater than 1 GHz. The analogue bandwidth may be between 80 MHz and 2.5 GHz, optionally between 80 MHz and 1 GHz, further optionally between 300 MHz and 1 GHz. The analogue bandwidth may be a −3 dB bandwidth.

The OWC unit may further comprise power electronics and control electronics. The OWC unit may further comprise a current source, voltage generation circuitry, and a controller for controlling operation of the at least one transmitter device and/or the at least one receiver device.

The OWC unit may have a maximum height of less than or equal to 10 mm and/or the OWC unit may have a maximum length of less than or equal to 10 mm and/or the OWC unit may have a maximum width of less than or equal to 10 mm.

The OWC unit may have a maximum height of less than or equal to 20 mm, optionally less than or equal to 10 mm, optionally less than or equal to 7 mm, optionally less than or equal to 5 mm, optionally less than or equal to 3 mm, optionally less than or equal to 1 mm.

A height of the OWC unit may be between 1 mm and 20 mm, optionally between 3 mm and 20 mm, further optionally between 5 mm and 20 mm, further optionally between 7 mm and 20 mm, further optionally between 10 mm and 20 mm. A height of the OWC unit may be between 1 mm and 10 mm, optionally between 3 mm and 10 mm, further optionally between 5 mm and 10 mm.

The OWC unit may have a maximum length of less than or equal to 20 mm, optionally less than or equal to 15 mm, optionally less than or equal to 10 mm, optionally less than or equal to 5 mm, optionally less than or equal to 2 mm.

A length of the OWC unit may be between 1 mm and 20 mm, optionally between 3 mm and 20 mm, further optionally between 5 mm and 20 mm, further optionally between 7 mm and 20 mm, further optionally between 10 mm and 20 mm. A height of the OWC unit may be between 1 mm and 10 mm, optionally between 3 mm and 10 mm, further optionally between 5 mm and 10 mm.

The OWC unit may have a maximum width of less than or equal to 20 mm, optionally less than or equal to 15 mm, optionally less than or equal to 10 mm, optionally less than or equal to 5 mm, optionally less than or equal to 2 mm.

A width of the OWC unit may be between 1 mm and 20 mm, optionally between 3 mm and 20 mm, further optionally between 5 mm and 20 mm, further optionally between 7 mm and 20 mm, further optionally between 10 mm and 20 mm. A height of the OWC unit may be between 1 mm and 10 mm, optionally between 3 mm and 10 mm, further optionally between 5 mm and 10 mm.

A volume of the OWC unit may be between 3 $mm^3$ and 1000 $mm^3$, optionally between 50 $mm^3$ and 1000 $mm^3$, further optionally between 50 $mm^3$ and 100 $mm^3$. Dimensions of the unit may be 10×7×5 mm. Dimensions of the unit may be 12×6×1 mm. Dimensions of the unit may be 10×10×4.5 mm.

The OWC unit may comprise a single circuit carrier structure. The OWC unit may comprise two circuit carrier structures. The OWC unit may comprise more than two circuit carrier structures.

The at least one receiver device may be arranged in a stacked arrangement with one or more further components, wherein the stacked arrangement is such that said one or more further components are located beneath the at least one receiver device and above the circuit carrier structure, or at least one of the circuit carrier structures, on which they are provided.

The at least one receiver device may comprise at least one concentrator.

The at least one transmitter device may comprises at least one emitter and at least one optical component arranged above the at least one emitter, wherein the at least one optical component is configured such that an eye of a user is prevented from getting closer than a threshold distance from the emitter(s) and/or such that an amplitude or other parameter of light (for example power per unit area) from the emitter(s) is below a threshold level after the light passes through the at least one optical component, wherein the threshold level comprises or is dependent on or is offset from an eye safe level.

The at least one optical component may comprise at least one micro-optic element and/or at least one diffuser.

The OWC unit may further comprise at least one thin-film filter.

The or each thin-film filter may be an angle-independent filter such that filtering to select a desired wavelength or desired wavelengths is substantially independent of an angle between the received light and the filter or a plane of the filter.

The OWC unit may comprise, or may be configured to connect to, conditioning circuitry configured to receive at least one signal and process the at least one signal to produce at least one conditioned signal representative of at data stream(s) and suitable for transmission using the at least one transmitter device, optionally wherein the at least one signal is received from a baseband device.

The OWC unit may further comprise, or be configured to connect to, further conditioning circuitry configured to receive signals from the at least one receiver device and process the plurality of signals to produce at least one conditioned signal representative of data stream(s).

The conditioning circuitry or further conditioning circuitry may be configured to perform at least one frequency conversion process, optionally wherein the at least one frequency conversion process comprises a plurality of frequency conversion processes.

At least one of the circuit carrier structures may comprise a double-sided circuit carrier structure or multi-layer circuit carrier structure.

The circuit carrier structures may be arranged in a stacked arrangement with one of the circuit carrier structures arranged above at least one of the other circuit carrier structures.

The circuit carrier structures may be arranged in a side-by-side arrangement and/or an angled arrangement.

The OWC unit may have a volume of greater than 50 $mm^3$.

The at least one concentrator may have an optical output aperture having an area greater than an area of at least one detector reception region of the at least one detector.

The diffuser may be configured to minimise a distance between an outer surface of the or each emitter and an outer surface of the diffuser.

A combined aperture area of the transmitter device(s) and/or receiver device(s) may be an area that represents at least 50% of a cross-sectional area of the OWC unit as measured in a plane of an aperture of the transmitter device(s) or receiver device(s) and orthogonal to a direction of transmission or reception.

A direction or average direction of transmission from the at least one transmitter device, or a direction or average direction of reception of the at least one receiver device, may be substantially parallel to a plane formed through a surface or axis of symmetry of the further device.

The OWC unit may be configured to provide optical wireless communication at a data transfer rate of up to 1.5 Gbps over a free space operational distance of greater than 1 m when provided with suitable optical wireless communication signals.

The data transfer rate may be between 100 Mbps and 1.5 Gbps, optionally between 0.5 Gbps and 1.0 Gbps, further optionally between 1.0 Gbps and 1.5 Gbps.

In a further aspect, which may be provided independently, there is provided an optical wireless communication (OWC) unit for transmitting and receiving data installable and a further device, comprising at least one transmitter device for transmitting modulated light comprising an optical wireless communication signal of said data and at least one receiver device for receiving modulated light comprising an optical wireless communication signal representative of said data, wherein the at least one receiver device comprises at least one detector, wherein the or each detector is configured to receive modulated light comprising optical wireless communication signals and to generate electrical signals corresponding to the modulated light comprising optical wireless communication signals; the OWC unit further comprising: analogue electronic circuitry for processing electronic signals received from said at least one detector and/or electronic signals to be provided to said at least one transmitter device; and at least one power connection and/or at least one data connection for connection to a power source and/or processing resource of the further device, the OWC unit being configured such that it is operable to provide OWC communication under control of said further device and/or so as to transmit data from/provide data to said further device, when said power connection and/or said data connection are connected to said power source and/or said processing resource via the at least one power connection and/or at least one data connection; wherein a ratio of OWC unit performance bandwidth to active receiver area is between 10 MHz/mm$^2$ and 170 MHz/mm$^2$; and wherein an active area of the at least one detector is greater than or equal to 2.5 mm$^2$.

The active area of the at least one detector may be between 2.5 mm$^2$ and 100 mm$^2$, optionally between 2.5 mm$^2$ and 50 mm$^2$, further optionally between 2.5 mm$^2$ and 25 mm$^2$. The active area of the at least one detector may be between 5 mm$^2$ and 100 mm$^2$, optionally between 10 mm$^2$ and 50 mm$^2$.

The ratio of OWC unit performance bandwidth to active receiver area may be between 10 MHz/mm$^2$ and 100 MHz/mm$^2$, optionally between 10 MHz/mm$^2$ and 50 MHz/mm$^2$. The ratio of OWC unit performance bandwidth to active receiver area may be between 50 MHz/mm$^2$ and 170 MHz/mm$^2$, optionally between 100 MHz/mm$^2$ and 170 MHz/mm$^2$.

The OWC unit may further comprise power and control electronics configured to provide voltage, current and control requirements for operation of the OWC unit.

The OWC unit may be a maximum height of less than or equal to 20 mm and/or the OWC unit may have a maximum length of less than or equal to 20 mm and/or the OWC unit may have a maximum width of less than or equal to 20 mm.

The OWC unit may have a maximum height of less than or equal to 10 mm and/or the OWC unit may have a maximum length of less than or equal to 10 mm and/or the OWC unit may have a maximum width of less than or equal to 10 mm.

The OWC unit may have a maximum height of less than or equal to 20 mm, optionally less than or equal to 10 mm, optionally less than or equal to 7 mm, optionally less than or equal to 5 mm, optionally less than or equal to 3 mm, optionally less than or equal to 1 mm.

A height of the OWC unit may be between 1 mm and 20 mm, optionally between 3 mm and 20 mm, further optionally between 5 mm and 20 mm, further optionally between 7 mm and 20 mm, further optionally between 10 mm and 20 mm. A height of the OWC unit may be between 1 mm and 10 mm, optionally between 3 mm and 10 mm, further optionally between 5 mm and 10 mm.

The OWC unit may have a maximum length of less than or equal to 20 mm, optionally less than or equal to 15 mm, optionally less than or equal to 10 mm, optionally less than or equal to 5 mm, optionally less than or equal to 2 mm.

A length of the OWC unit may be between 1 mm and 20 mm, optionally between 3 mm and 20 mm, further optionally between 5 mm and 20 mm, further optionally between 7 mm and 20 mm, further optionally between 10 mm and 20 mm. A height of the OWC unit may be between 1 mm and 10 mm, optionally between 3 mm and 10 mm, further optionally between 5 mm and 10 mm.

The OWC unit may have a maximum width of less than or equal to 20 mm, optionally less than or equal to 15 mm, optionally less than or equal to 10 mm, optionally less than or equal to 5 mm, optionally less than or equal to 2 mm.

A width of the OWC unit may be between 1 mm and 20 mm, optionally between 3 mm and 20 mm, further optionally between 5 mm and 20 mm, further optionally between 7 mm and 20 mm, further optionally between 10 mm and 20 mm. A height of the OWC unit may be between 1 mm and 10 mm, optionally between 3 mm and 10 mm, further optionally between 5 mm and 10 mm.

A volume of the OWC unit may be between 3 mm$^3$ and 1000 mm$^3$, optionally between 50 mm$^3$ and 1000 mm$^3$, further optionally between 50 mm$^3$ and 100 mm$^3$. Dimensions of the unit may be 10×7×5 mm. Dimensions of the unit may be 12×6×1 mm. Dimensions of the unit may be 10×10×4.5 mm.

A combined aperture area of the transmitter device(s) and/or receiver device(s) may be an area that represents at least 50% of a cross-sectional area of the OWC unit as measured in a plane of an aperture of the transmitter device(s) or receiver device(s) and orthogonal to a direction of transmission or reception. The combined aperture area may be between 50% and 100% of the cross-sectional area, optionally between 60% and 100% of the cross-sectional area, further optionally between 70% and 100% of the cross-sectional area, further optionally between 90% and 100% of the cross-sectional area. The combined aperture area may be between 50% and 60% of the cross-sectional area, optionally between 50% and 70% of the cross-sectional area, further optionally between 50% and 80% of the cross-sectional area.

A direction or average direction of transmission from the at least one transmitter device, or a direction or average direction of reception of the at least one receiver device, may be substantially parallel to a plane formed through a surface or axis of symmetry of the further device.

The at least one receiver device may comprise at least one concentrator, wherein the at least one concentrator has an optical output aperture having an area greater than an area of at least one detector reception region of the at least one detector.

The receiver device may comprise at least one filter.

The or each filter may be an angle-independent filter such that filtering to select a desired wavelength or desired wavelengths is substantially independent of an angle between the received light and the filter or a plane of the filter.

At least part of the analogue electronic circuitry may be incorporated into an application-specific integrated circuit (ASIC).

Features in any aspect may be applied as features in any other aspect. For example, apparatus features may be provided as method features and vice versa.

BRIEF DESCRIPTION OF THE DRAWINGS

Embodiments of the invention are now described, by way of non-limiting examples, and are illustrated in the following figures, in which.

DETAILED DESCRIPTION

Optical wireless communication (OWC) systems transmit data via light. The term light used herein may, for example, refer to electromagnetic waves with wavelengths in a range 1 nm to 1 mm. Therefore, light may include ultraviolet, visible and near-infrared electromagnetic radiation.

Figure 1:
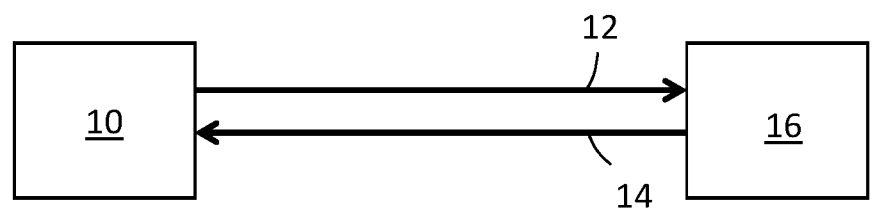
FIG. 1 is a schematic diagram of an optical wireless communication system.

FIG. 1 is a schematic block diagram illustrating an OWC system. A first transceiver apparatus 10 may be configured to send and receive wireless optical signals in which information is encoded. The first transceiver apparatus 10 may be configured to send wireless optical signals through a first optical communication channel 12 and receive optical wireless signals through a second optical communication channel 14 from a second transceiver apparatus 16. The optical communication channels 12, 14 are free-space communication channels. Each of the optical communication channels may have a characteristic optical wavelength. Each of the optical communication channels may also have a characteristic range of wavelengths.

For full duplex communication, the characteristic optical wavelength of the second optical communication channel 14 may be different to the characteristic optical wavelength of the first optical communication channel 12. For half-duplex communication, for example in device-to-device communication, the characteristic optical wavelengths of the first optical communication channel 12 and the second optical communication channel 14 may be the same. The OWC system may be a LiFi system or a visible light communication (VLC) system.

The first transceiver apparatus 10 may comprise or form part of an OWC device that may be referred to as OWC device. An OWC device may be mobile or fixed. Without limitation, an OWC device may be integrated into a smartphone, tablet, personal computer, laptop, desktop, other smart device or Internet of Things (IoT) device. An OWC device may be an OWC station (STA) for use with an OWC access point (AP).

The second transceiver apparatus 16 may comprise or form part of a second OWC device or an OWC access point (AP). An AP may provide access to a network, for example a local network.

The transceiver apparatuses may support a bi-directional communication protocol. The transceiver apparatuses may support any suitable communication protocol, for example IEEE 802.15.7, 802.15.13, 802.11 or extensions or developments thereof; ITU-T G.9960 or extensions or developments thereof; or ITU-T G.vlc or extensions or developments thereof.

Each of the optical communication channels 12, 14 may comprise a respective OWC communication channel, for example a LiFi communication channel. An OWC communication channel may have various desirable characteristics. For example, it may have a range of up to 20 m or more, and a transmission cone in a range of 10 degrees to 120 degrees in some arrangements. It may have high bandwidth in comparison to for example RF or IrDA (Infrared Data Association) protocols. Full-duplex may be possible by using two wavelengths or wavelength ranges allowing higher throughput speeds, e.g. halving time or doubling bandwidth of communication. The bandwidth of communication channel 12 may be independent of bandwidth of communication bandwidth of 14, and therefore there may potentially be twice the bandwidth available for the communication exchange. It may be difficult to fake due to complexity of protocol and data stream format. It may be possible to spectrum hop, for example.

The transceiver apparatus 16 may comprise or form part of a luminaire, which may be part of an overhead lighting system. The transceiver apparatus 10 may form part of a user device, for example a mobile device or dongle. The optical communication channels 12, 14 may be downlink channels that are used to send information from the luminaire to the mobile device. In other examples the transceiver apparatuses 10 and 16 may each comprise or form part of any suitable device, for example any device configured to transmit and/or receive OWC data.

Figure 2:
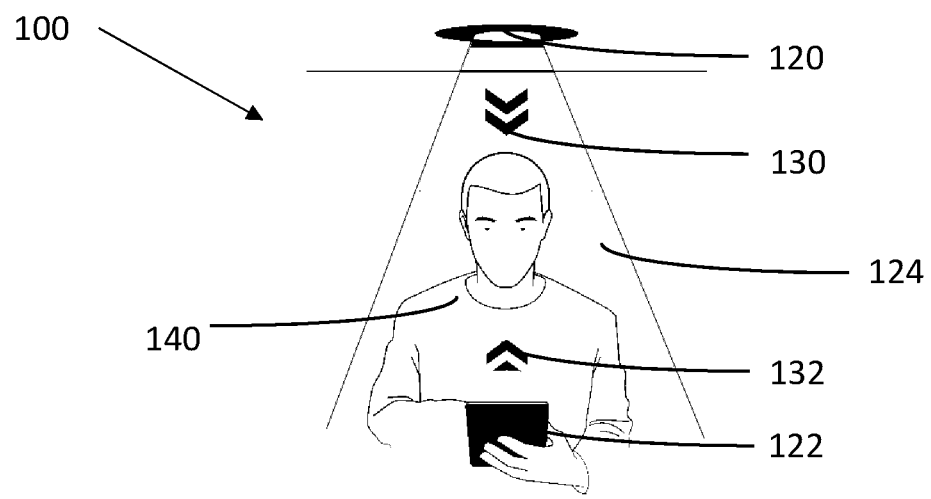
FIG. 2 is a schematic diagram of the optical wireless communication in use.
Figure 3:
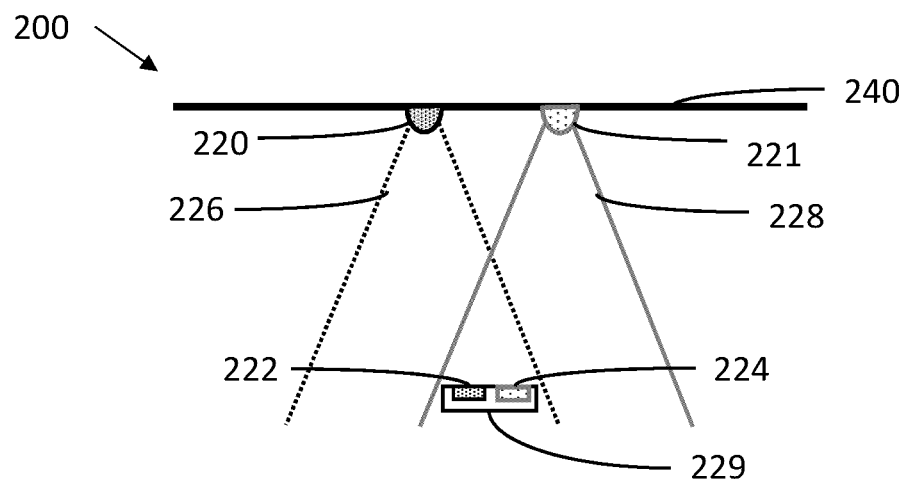
FIG. 3 is a schematic diagram of an example optical wireless communication downlink architecture.
Figure 4:
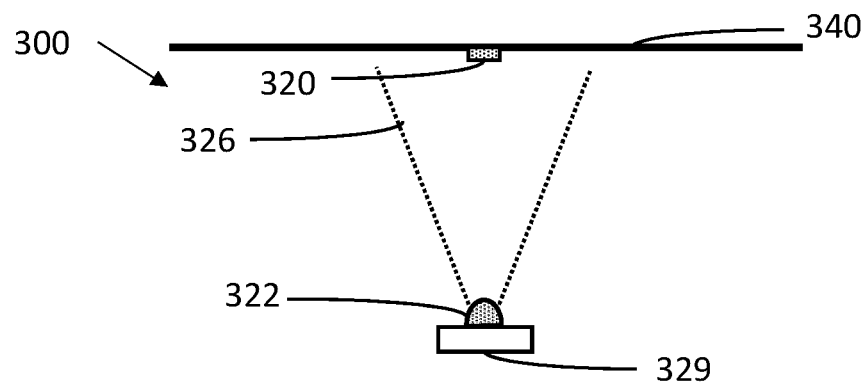
FIG. 4 is a schematic diagram of an example optical wireless communication uplink architecture.

A proposed system architecture (AP-STA), as shown in FIG. 2, FIG. 3, and FIG. 4, may include an AP, otherwise referred to as an OWC apparatus, and a STA, otherwise referred to as an OWC device. FIG. 2 is a schematic illustration of an example of use of the OWC system. FIG. 2 shows an example OWC downlink architecture for AP-STA. A first and second AP transmitter, for example on a ceiling, may transmit data by modulating light on one or more wavelengths. The STA may have one or more receivers capable of receiving the one or more wavelengths of the downlink. FIG. 4 shows an example OWC uplink architecture for AP-STA. The STA on the mobile device may be transmitting data by modulating light of at least one wavelength or range of wavelengths. The AP may have at least one receiver capable of receiving the at least one wavelength of the uplink.

Preferably, the OWC system STA may comprise one or more receivers for receiving data via a modulated light downlink from one or more APs. The receiver(s)/detector(s) may comprise avalanche photodiodes (APDs).

One or more filters on the one or more receivers may allow reception of different wavelengths or range of wavelengths. For example, a first wavelength or range of wavelengths may be in the visible spectrum and a second wavelength or range of wavelengths may be in the infrared spectrum. In other embodiments, the first wavelength or range of wavelengths may comprise any wavelength suitable for OWC. The second wavelength or range of wavelengths may comprise any wavelength suitable for OWC.

The OWC system STA may comprise one or more STA transmitters for transmitting data via a modulated light uplink to at least one AP. The communication from the STA to the AP comprises uplink transmission of modulated light. For example, this uplink may be conducted at a third wavelength, for example in the infrared spectrum different to the second wavelength above.

FIGS. 2, 3 and 4 are now described in greater detail. FIG. 2 is a schematic diagram illustrating operation of an example OWC system 100. An access point (AP) 120 is operable to communicate with a device 122 via a first link 130 and a second link 132. An operating zone 124 is shown, within which the access point 120 and the device 122 are able to communicate. The first link 130 is a downstream link from the access point 120 to the device 122. The second link 132 is an upstream link from the device 122 to the access point 120. A user 140 is shown using the device 122.

FIG. 3 is a schematic diagram illustrating operation of an example OWC system 200. A first AP transmitter 220 and a second AP transmitter 221 are shown in an example configuration on a ceiling 240. A device 229 comprises a first receiver 222 and a second receiver 224.

A first link within operating zone 226 is operable to communicate between the first AP transmitter 220 and the first receiver 222. A second link within operating zone 228 is operable to communicate between the second AP transmitter 221 and the second receiver 224.

The first link is a downstream link operable to transmit from the first AP transmitter 220 to the first receiver 222. The second link is a downstream link operable to transmit from the second AP transmitter 221 to the second receiver 224.

The first AP transmitter 220 and the first receiver 222 are operable to communicate using a first wavelength. The second AP transmitter 221 and the second receiver 224 are operable to communicate using a second wavelength.

FIG. 4 is a schematic diagram illustrating operation of an example OWC system 300. An access point comprises a receiver 320. The receiver 320 is shown in an example configuration on a ceiling 340. A device 329, for example a mobile device, is shown. The device 329 comprises a transmitter 322.

A link within operating zone 326 is operable to communicate between the transmitter 322 and the receiver 320. The link is an upstream link operable to transmit from the transmitter 322 to the receiver 320.

The transmitter 322 and the receiver 320 are operable to communicate by modulating light having at least one wavelength or a range of wavelengths. The receiver 320 is capable of receiving the at least one wavelength or range of wavelengths of the uplink from the transmitter 322.

Figure 5:
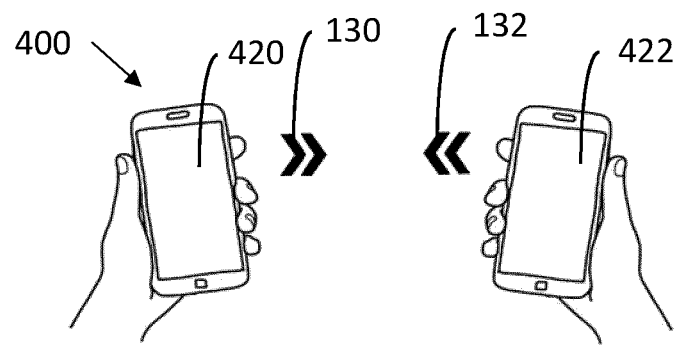
FIG. 5 is a schematic diagram of the optical wireless communication system in use between two devices.

A second, alternative or additional, system architecture for device to device (D2D) communication consisting of two OWC devices is shown in FIG. 5. In some embodiments, the system of FIG. 5 is configured to provide D2D communication operating using a half-duplex scheme. In other embodiments, the system of FIG. 5 may be configured to operate using a full-duplex scheme. Further detail can be found in patent application, GB1903867.8, which is incorporated by reference. In this second architecture, the OWC devices may comprise two transmitters, a first OWC transmitter for performing full-duplex OWC, with an AP using the third wavelength referenced above, and a second OWC transmitter capable of half-duplex OWC with another device using the second wavelength referenced above. The OWC device comprises at least one receiver capable of receiving at least one wavelength of light. Alternatively, the OWC device may comprise one or more OWC transmitters for performing full-duplex and/or half-duplex and/or or simplex OWC with at least one other OWC device and/or apparatus.

In detail, FIG. 5 is a schematic diagram illustrating operation of an example OWC system 400. A first device 420 is in communication with a second device 422. The first device 420 is operable to transmit data to the second device 422 using a first link 130. The second device 422 is operable to transmit data to the first device 420 using a second link 132.

An optical front end (OFE) system according to an embodiment is described below. The OFE system may also be referred to as an OWC OFE system, an OWC OFE unit, or an OWC unit.

The optical front end (OFE) system described herein may be for use in an optical wireless communications (OWC) system with ≥80 MHz, optionally ≥300 MHz analogue bandwidth. The OFE system or unit may have an analogue −3 dB bandwidth of operation that is greater than or equal to 80 MHz. The OFE system or unit may have an analogue −3 dB bandwidth of operation that is greater than or equal to 300 MHz, optionally up to 2.5 Ghz.

The OFE system may draw ≤600 mW. In addition, the system size is reduced for the unit, or package, with a small target footprint, optionally 10×7×5 mm, 12×6×1 mm or 10×10×4.5 mm. This may enable OWC packages, such as LiFi packages, to be built into mobile devices such as smart phones and tablets and may promote OWC as an enabling technology for the IoT.

The OFE system is configured to be installed into a further device, for example a mobile device such as a smartphone.

Where the OFE unit or system is installed in small devices, an operational opening or optical aperture(s) may be selected to be small or at least thin in one direction, to achieve space efficiency.

An optical aperture of a transmitter device or receiver device is the aperture allowing optical signal transmission or reception by that transmitter device or receiver device. An area of the combined optical aperture of the transmitter device(s) and/or receiver device(s) of the OFE unit may represent at least half of the cross sectional area of the OFE unit measured in a plane of the aperture of the transmitter or the receiver orthogonal to the direction of transmission or reception.

While front and rear surfaces of mobile devices may be convenient for placement of optical apertures, the edges of these devices may be used provided the OFE unit or system is sufficiently small in at least one plane. In embodiments in which the optical aperture uses the edge of the mobile device, the profile and space envelope of the OFE is selected to fit within at least the thickness dimension of the mobile or further device. A direction or average direction of OFE unit transmitter(s) and/or receiver(s) or a plane formed by the receiver detector area is then orthogonal to the thickness of the device and/or parallel to a plane formed through a surface or axis of symmetry of the mobile or further device.

In combination with an appropriate baseband device, the OWC system may be capable of transmitting data at a rate of >300 Mbps, optionally >1 Gbps at a working distance of ≥1 m. The OWC system may be configured to provide optical wireless communication at a data transfer rate of up to 1.5 Gb/sec over a free space operational distance of greater than 1 m when provided with suitable optical wireless communication signals.

The public pureLiFi-XC has a size of 85×30×10 mm and operates with 16 MHz bandwidth at full-duplex at a data rate of 43 Mbps in both directions. The pureLiFi-XC contains a transmitter, a detector and analogue electronics that comprise the OFE of the system. A challenge for the commercial application to smaller products is to fit all of these components into a much smaller unit while also significantly increasing the performance. There is a significant dual challenge to produce a commercial device of this reduced order of magnitude and performance increase.

The below description looks at options for combining the components necessary for OWC into a small package and the constraints that have led to the choice of components. All unnecessary components may be removed, and the remaining essential components may be packed as tightly together as possible.

The components that may be required to perform bi-directional OWC may be:

At least one detector, for example a large area array of detectors. Large may be defined, for example, as 10 mm$^2$ At least one transmitter or light source, for example LED(s) or laser(s) Optional optical components on either/both of the detector(s) and/or source(s). These optical components may include filters, lenses, concentrators, diffusers and/or mirrors.

A current source to drive the light source(s). Preferably, the current source may be largely linear, largely linear being defined as <1 dB percent loss of linearity.

Analogue electronics to process the signal received on the detector, including summer circuits, transimpedance amplifiers (TIAs), voltage gain amplifiers (VGAs), automatic gain controllers (AGCs), feedback electronics, signal conditioning circuitry etc. Some or all analogue electronics may be incorporated into an application specific integrated circuit (ASIC) or other integrated circuit or discrete components to realise an equivalent functionality to an ASIC.

Voltage generation circuitry, or voltage source, optionally high voltage generation circuitry where high voltage is defined as >30V.

Optionally in addition to an ASCI or equivalent integrated circuit, other discrete electronic components such as inductors, resistors and capacitors, diodes, transistors, switches may be included the OWC system.

Circuit board or equivalent such as integrated silicon as a package

A connector to connect electrically the OFE system to the rest of the OWC receiver chain in the OWC system, for example a baseband device. Optionally the baseband device may comprise a baseband device intended for use with a radio-frequency (RF) integrated circuitry. Optionally, the baseband device may be a MIMO baseband device.

The design may comprise a system-in-package (SiP), incorporating one or more integrated circuits and other components in a single package that performs all or most of the functions of the optical front end of the OWC, for example LiFi, system.

It may be desirable to integrate the components required for OWC into the smallest size, optionally the smallest SiP, possible. The choice and combination of components may be critical to make this possible.

To reiterate, it may be desirable to provide an optical front end (OFE) for an optical wireless communications (OWC) system, specifically a LiFi system with 80 MHz, optionally 300 MHz analogue bandwidth.

The OFE system or unit may have an analogue −3 dB bandwidth of functional operation of between 80 Mhz and 500 Mhz optionally up to 2.5 Ghz. Typically, an operating bandwidth of the OFE depends on the selection, utilisation and arrangement of the individual components.

The OFE system may draw 600 mW. In addition, the system size may be reduced for the unit, or package, with a small target footprint, optionally 10×7×5 mm, 12×6×1 mm or 10×10×4.5 mm. In some embodiments, a footprint volume or space envelope of the OFE system may be greater than 50 mm$^3$. In determining a space envelope volume of the OFE system, the dimensions on which the space envelope volume are based are those of the maximum dimension in that plane, so for example the height measurement for a volume calculation of the package in a height×length×width package is taken as the maximum height of the unit at any point in that direction excluding dimensions of electrical connections.

A reduced system size may enable OWC packages, such as LiFi packages, to be built into mobile devices such as smart phones and tablets and may promote OWC as an enabling technology for the IoT. In combination with an appropriate baseband device, the OWC system may be capable of transmitting data at a rate of >300 Mbps, optionally >1 Gbps at a working distance of ≥1 m. In some embodiments at least part of the OWC OFE system or unit power and/or control and/or electronic circuitry may be provided by the further device, for example by a mobile device into which the OWC unit is built.

FIGS. 6 to 11 show a number of layout options that could be adopted for an OWC Device SiP (System-in-Package). Following the description of FIGS. 6 to 11, there is a discussion on the design choices for specific components that have been made in certain embodiments and how these have impacted the package design and footprint.

In general, in a system stripped down to its minimal components, there are relatively few components which may be tall and constrain the height of the package. They include:

Receiver elements such as one or more OWC detector, concentrator, and detector: for example, combined receiver elements may be in the region of 2 mm in height, optionally 2.4 mm in height.

External components such as inductors and capacitors: may be in the region of 1-1.45 mm in height.

Transmitter elements such as one or more OWC light source and diffuser: height constraints of the transmitter elements in the system are generally smaller than that of the external or receiver elements. Therefore, the overall transmitter system height may match that of the receiver system, for example 2.4 mm in height.

The footprint of the above components may be comparatively small.

All other components have a relatively smaller height to the above, for example less than 0.5 mm. This enables a number of footprint- and height-minimising form factors, for example using a double decker solution to reduce the area of the final package by placing the detectors and filters above the analogue control chip, the high voltage chip and other low-profile external components. Three possible form factors are described below.

Features described in one option may be used in other options. Features of different embodiments may be combined in any suitable combination.

Option 1: Upper Level Mounting

Figure 6:
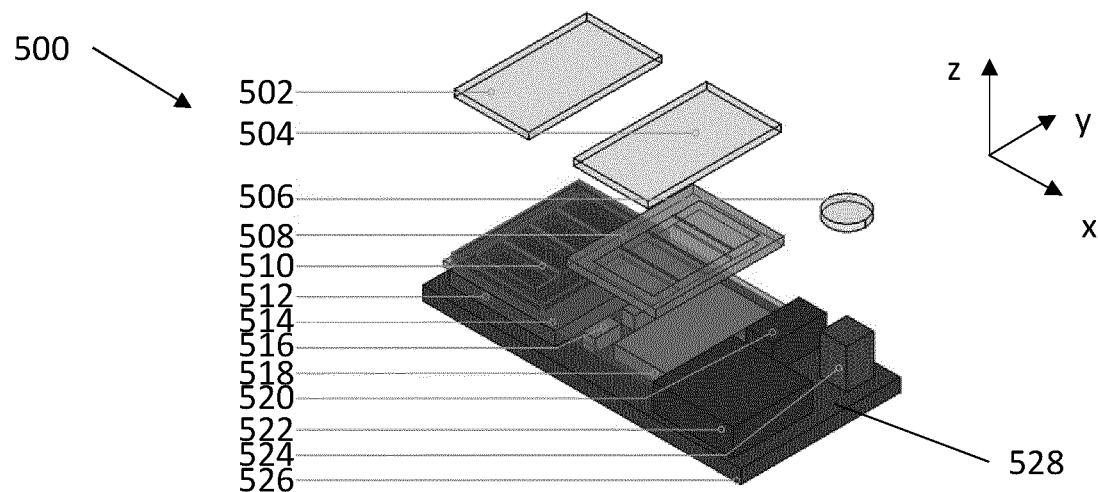
FIG. 6 is an exploded isometric schematic diagram of a first optical wireless communication system.
Figure 7A:
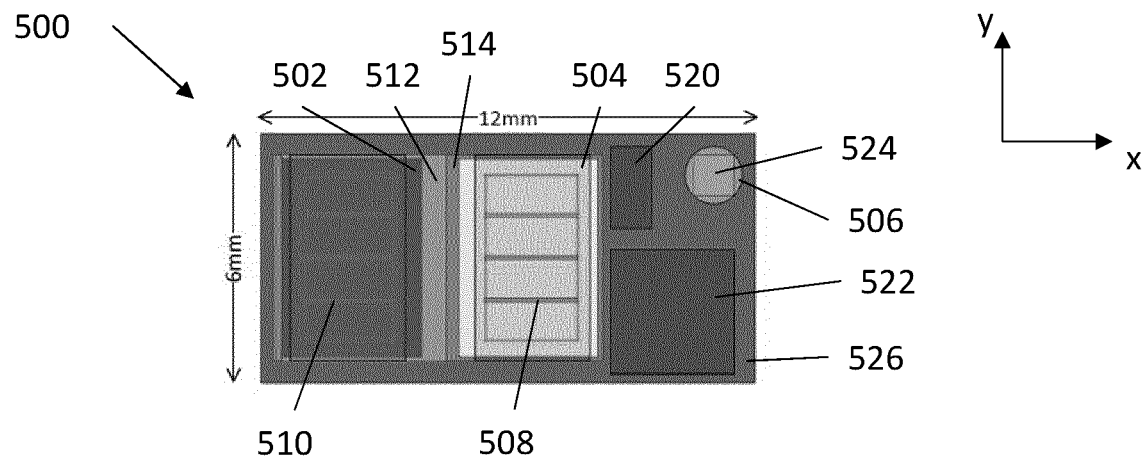
FIG. 7A is a non-exploded top-view schematic diagram of the first optical wireless communication system.
Figure 7B:
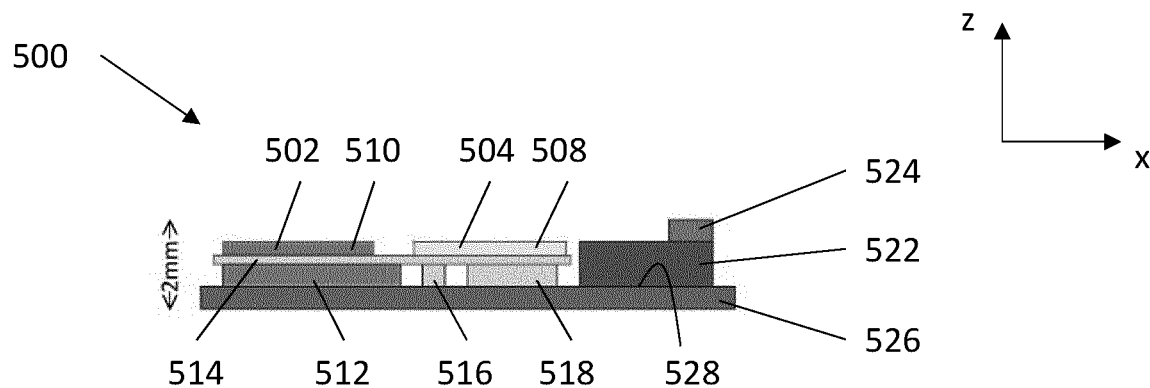
FIG. 7B is a non-exploded side-view schematic diagram of the first optical wireless communication system.

The receiver elements/components may be layered as in FIG. 6, FIG. 7A, and FIG. 7B, in an OWC OFE SiP architecture referred to as Option 1. FIG. 6 shows an exploded view of a proposed Option 1 OWC OFE SiP. FIGS. 7A and 7B show side and top views of the Option 1 OWC OFE SiP.

A stacking structure may be obtained by mounting the detectors on an upper level of the system above a motherboard for other components.

In Option 1, two detectors and their associated filters may be positioned above other components in the receiver chain. The detectors may be two APD arrays. One APD array and filter pairing may be designed to receive light in the blue spectrum around 450 nm in wavelength and one may for example be designed to receive light in the IR spectrum around 860 nm in wavelength. The two detectors may be mounted on an APD carrier, for example a ceramic carrier. The APD carrier may be mounted above an analogue ASIC, capacitors and/or a high voltage integrated circuit (IC). All other components of the SiP may be mounted onto a single substrate. These components may include an analogue ASIC, capacitors and/or high voltage IC in addition to transistors, the transmitter element(s)/emitter. Through positioning the detectors above associated receiver circuitry, collocated with taller OWC transceiver components, both the height and the footprint of the OWC system may be minimised.

In detail, FIG. 6 is a schematic diagram illustrating an exploded example isometric view of an optical wireless communication optical front end system-in-package device 500. The device 500 comprises an infrared filter window 502, a blue filter window 504, a diffuser window 506, a blue photodiode 508, an infrared photodiode 510, an analogue integrated circuit 512, an avalanche photodiode carrier 514, capacitors (0402) 516, a high voltage integrated circuit 518, a first inductor 520, a second inductor 522, an emitter 524, and a substrate 526.

An upper surface 528 of the substrate 526 is in contact with a lower surface of the emitter 524. The upper surface 528 of the substrate 526 is in contact with a lower surface of the first inductor 520 and the second inductor 522. The upper surface 528 of the substrate 526 is in contact with a lower surface of the high voltage integrated circuit 518. The upper surface 528 of the substrate 526 is in contact with a lower surface of the capacitors 516. The upper surface 528 of the substrate 526 is in contact with a lower surface of the analogue integrated circuit 512.

An upper surface of the analogue integrated circuit 512 is in contact with a lower surface of the avalanche photodiode carrier 514. An upper surface of the capacitors 516 is in contact with a lower surface of the avalanche photodiode carrier 514. An upper surface of the high voltage integrated circuit 518 is in contact with a lower surface of the avalanche photodiode carrier 514.

An upper surface of the avalanche photodiode carrier 514 is in contact with a lower surface of the infrared photodiode 510.

Cartesian axes are shown, where upper and lower surfaces are defined relative to a z-axis and lateral displacements are relative to an x-y plane.

FIG. 7A is a schematic diagram illustrating an alternative view of the optical wireless communication optical front end system-in-package device 500 of FIG. 6. In particular, FIG. 7A shows a top-down non-exploded view of the same of the optical wireless communication optical front end system-in-package device 500 of FIG. 6.

The first inductor 520 and the second inductor 522 are laterally displaced from one another so such that they do not overlap.

The diffuser window 506 and the emitter 524 are mutually centred. Neither of the diffuser window 506 or the emitter 524 laterally overlap with the first inductor 520 or the second inductor 522.

The blue filter window 504 and the blue photodiode 508 laterally overlap, such that they are mutually centred and of the same shape and size.

Neither of the blue filter window 504 or the blue photodiode 508 laterally overlap with the first inductor 520, second inductor 522, diffuser window 506, emitter 524, infrared filter window 502, or the infrared photodiode.

The infrared filter window 502 and the infrared photodiode 510 laterally overlap, such that they are mutually centred and of the same shape and size.

Neither of the infrared filter window 502 or the infrared photodiode 510 laterally overlap with the first inductor 520, second inductor 522, diffuser window 506, or emitter 524.

The analogue integrated circuit 512 laterally overlaps with the infrared filter window 502 and the infrared photodiode 510 but does not laterally overlap with the first inductor 520, second inductor 522, diffuser window 506, or emitter 524.

The avalanche photodiode carrier 514 laterally overlaps with the analogue integrated circuit 512, infrared filter window 502, and the infrared photodiode 510 but does not laterally overlap with the first inductor 520, second inductor 522, diffuser window 506, or emitter 524.

FIG. 7B is a schematic diagram illustrating a further alternative view of the optical wireless communication optical frontend system-in-package device 500 of FIG. 6 and FIG. 7A. In particular, FIG. 7B shows a side-on non-exploded view of the optical wireless communication optical front end system-in-package device 500 of FIG. 6 and FIG. 7A.

An upper surface 528 of the substrate 526 is in contact with a lower surface of the second inductor 522. The upper surface 528 of the substrate 526 is in contact with a lower surface of the high voltage integrated circuit 518. The upper surface 528 of the substrate 526 is in contact with a lower surface of the capacitors 516. The upper surface 528 of the substrate 526 is in contact with a lower surface of the analogue integrated circuit 512.

An upper surface of the analogue integrated circuit 512 is in contact with a lower surface of the avalanche photodiode carrier 514. An upper surface of the capacitors 516 is in contact with a lower surface of the avalanche photodiode carrier 514. An upper surface of the high voltage integrated circuit 518 is in contact with a lower surface of the avalanche photodiode carrier 514.

An upper surface of the avalanche photodiode carrier 514 is in contact with a lower surface of the infrared photodiode 510.

The upper surface of the avalanche photodiode carrier 514 is in contact with a lower surface of the blue photodiode 508.

An upper surface of the infrared photodiode 510 is in contact with a lower surface of the infrared filter window 502.

The upper surface of the infrared photodiode 508 is in contact with a lower surface of the blue photodiode 504.

Option 2: Double Sided SiP

Figure 8A:
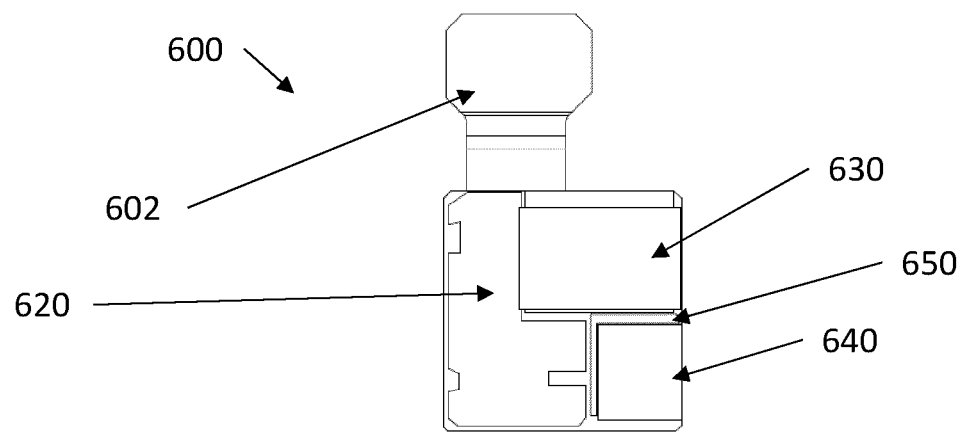
FIG. 8A is a schematic diagram of a first view of a second optical wireless communication system.
Figure 8B:
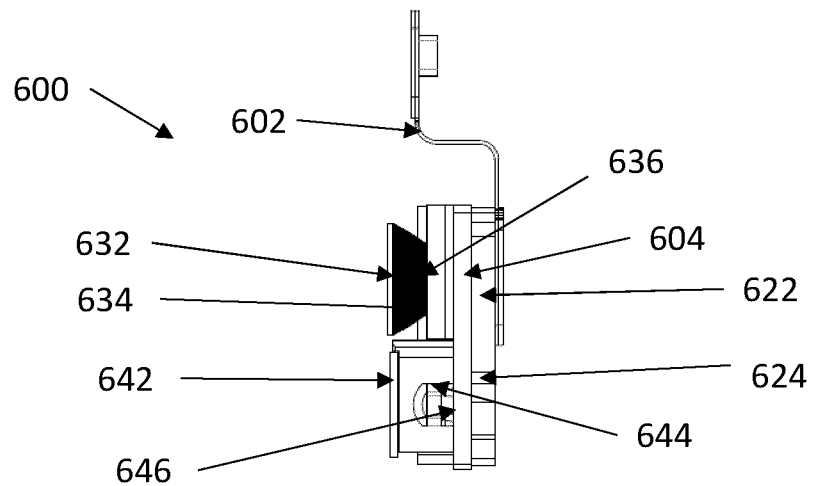
FIG. 8B is a schematic diagram of a second view of the second optical wireless communication system.

An alternative layout for the OWC OFE SiP, Option 2, is shown in FIG. 8A and FIG. 8B. FIGS. 8 and 8B shown details of an example double-sided SiP layout with components on either side of a double-sided PCB.

A double-sided PCB, also known as double-sided plated thru (DSPT), may be comprised of a dielectric layer with conductive layers, for example circuit copper layers, on the upper and lower faces and internal layers. Optical elements of the SiP, specifically the detector(s), concentrator(s), filter(s), light source(s), for example a VCSEL array, and diffuser(s) as well as other optical elements may be mounted on the upper face of the double-sided PCB. Also on the upper face of the double-sided PCB. The analogue ASIC, control electronics, power electronics and passive components such as capacitors and inductors may be mounted on the lower face of the double-sided PCB. Also, some of the electronics may also be positioned on the upper face of the double-sided PCB, for example MOSFETs, resistors capacitors. Positioning of the electronics may optimise the space available on both side of the PCB, both in area and height of the packaging. For example, electrical components of a similar eight to the optical elements may be positioned next to the optical elements on the upper face of the double-sided PCB. Tracks and/or vias are used for electrical communication between components and sides and/or layers. Configuration of these tracks and/or vias can be optimised to reduce interference between receiver and transmitter components.

In detail, FIG. 8A is a schematic diagram illustrating an example system-in-package device 600. In particular, a top-down double-sided layout is shown with components on either side of a double-sided printed circuit board.

The device 600 comprises a connector 602, electronics 620, an Rx aperture 630, shield 650, and a Tx aperture 640.

FIG. 8B is a schematic diagram illustrating an alternative view of the example system-in-package device 600. In particular, a side-on double-sided layout is shown with components on either side of a double-sided printed circuit board 604.

The device 600 comprises a connector 602, control electronics 622, power electronics 624, an Rx filter 632, an Rx optic 634, an Rx detector 636, a Tx diffuser 642, a Tx optic 644, and a Tx source (vertical cavity surface-emitting laser) 646.

The Rx filter 632 is in contact with the Rx optic 634, the Rx optic 634 is in contact with the Rx detector 636. Light passing from outside the device 600 into the Rx detector 636 first passes through the Rx filter 632 then the Rx optic 634.

Light passing from the Tx source 646 out of the device 600 first passes through the Tx optic 644 and then out the Tx diffuser 642. The connector 602, control electronics 622 and power electronics 624 are positioned on one side of the double-sided printed circuitry board 604. The Tx source 646, Tx optic 644, Tx diffuser 642, Rx optic 634 and Rx detector 636 are positioned on the other side of the double-sided printed circuit board 604.

Option 3: Stacked SiP

Figure 9A:
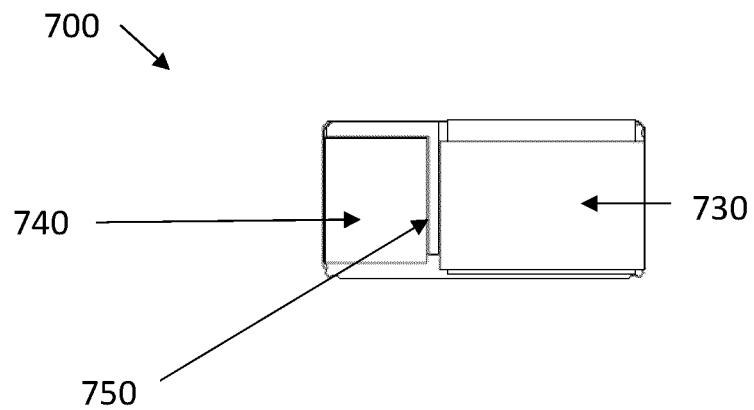
FIG. 9A is a schematic diagram of a first view of a third optical wireless communication system.
Figure 9B:
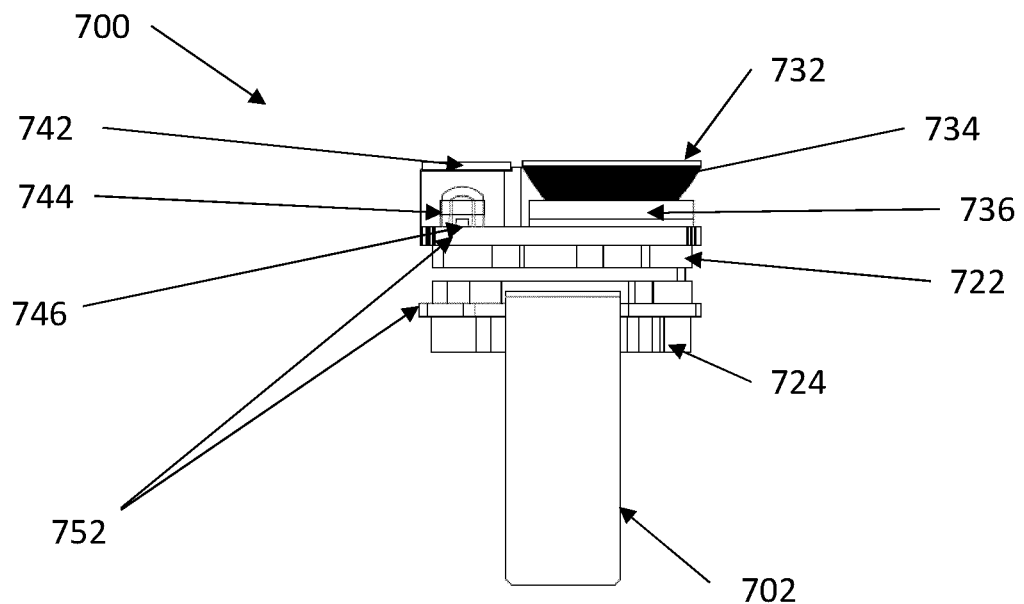
FIG. 9B is a schematic diagram of a second view of the third optical wireless communication system.

A third alternative layout for the SiP, Option 3 is shown in FIG. 9A and FIG. 9B. FIGS. 9A and 9B show a stacked SiP layout with components on either side of two double sided stacked PCBs.

Figure 10:
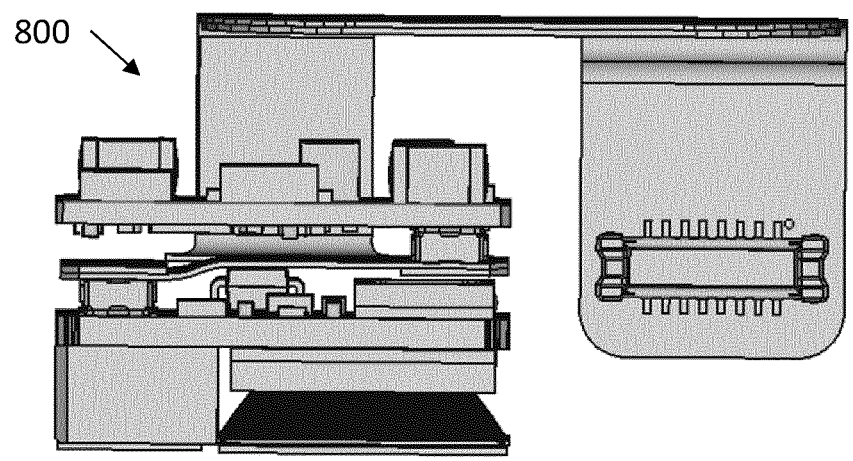
FIG. 10 is a schematic diagram of a system-in-package layout.

A stacked or multilayer SiP may use two double sided PCBs or PCB layers to achieve an OWC SiP with minimal footprint and height. Receiver filters, optics and detectors and/or transmitter diffusers, optics and light source may be mounted on the upper face of the top double-sided PCB, Control electronics such as the analogue ASIC may be mounted on the lower face of the top double-sided PCB. A connector to external circuitry may be connected to both the lower face of the upper PCB and the upper face of the bottom PCB as shown in FIG. 10. FIG. 10 is a diagram showing flex connector attached to both top and bottom of a stacked SiP layout comprising two double-sided PCBs.

Power electronics such as the high voltage IC may be mounted on the lower side of the bottom PCB. Tracks and/or vias may be used for electrical communication between components. Configuration of these tracks and/or vias may reduce interference between receiver and transmitter components. The two or more stacked and/or double-sided PCBs are connected, optionally at one edge by a connector, optionally a flex cable.

An alternative configuration of the two double-sided PCBs shown in FIG. 9A and FIG. 9B may be side-by-side with the 'bottom' PCB pivoted by 180 degrees as shown in FIG. 11A-D. FIGS. 11A to 11D show a side-by-side SiP layout with connector connecting two PCBs with components on either side of the side-by-side PCBs.

FIG. 9A is a schematic diagram illustrating an example top-down view of an stacked system-in-package layout with components on either side of two double stacked printed circuit boards.

The device 700 comprises an Rx aperture 730, shield 750, and a Tx aperture 740.

FIG. 9B is a schematic diagram illustrating an alternative view of the example system-in-package device 700.

The device 700 comprises a connector 702, control electronics 722, power electronics 724, an Rx filter 732, an Rx optic 734, an Rx detector 736, a Tx diffuser 742, a Tx optic 744, and a Tx source (vertical cavity surface-emitting laser) 746.

The Rx filter 632 is in contact with the Rx optic 734, the Rx optic 734 is in contact with the Rx detector 736. Light passing from outside the device 700 into the Rx detector 736 first passes through the Rx filter 732 then the Rx optic 734.

Light passing from the Tx source 746 out of the device 700 first passes through the Tx optic 744 and then out the Tx diffuser 742.

FIG. 10 is a schematic diagram illustrating an example flexible connector attached to both a top and bottom stacked system-in-package layout comprising two double-sided printed circuit boards.

Figure 11A:
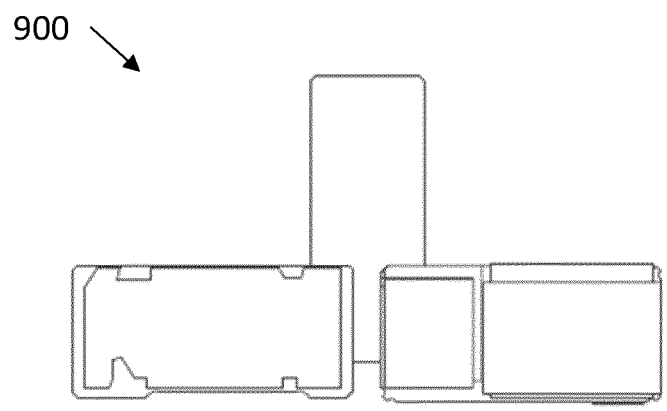
FIG. 11A is a schematic diagram of a first view of the third optical wireless communication system system-in-package layout.

FIG. 11A is a schematic diagram illustrating a first example view of a system-in-package layout including a connector that connects two printed circuit boards with components on either side of the side-by-side printed circuit boards.

Figure 11B:
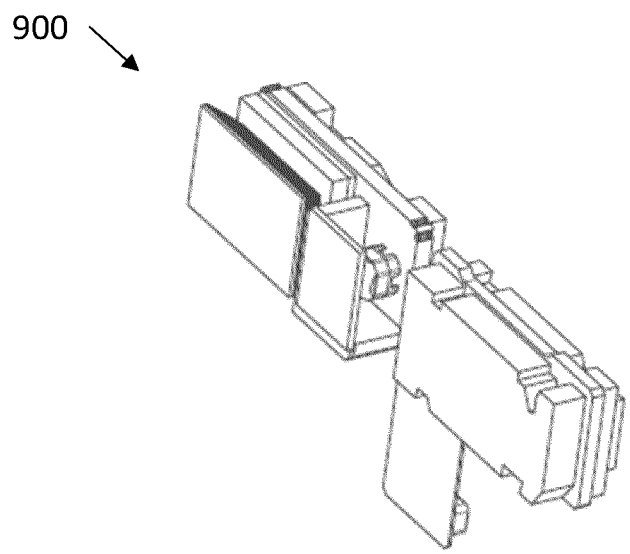
FIG. 11B is a schematic diagram of a second view of the third optical wireless communication system system-in-package layout.

FIG. 11B is a schematic diagram illustrating a second example view of the system-in-package layout.

Figure 11C:
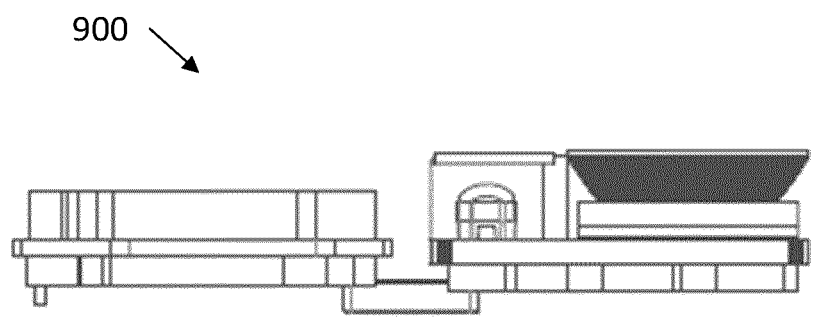
FIG. 11C is a schematic diagram of a third view of the third optical wireless communication system system-in-package layout.

FIG. 11C is a schematic diagram illustrating a third example view of the system-in-package layout.

Figure 11D:
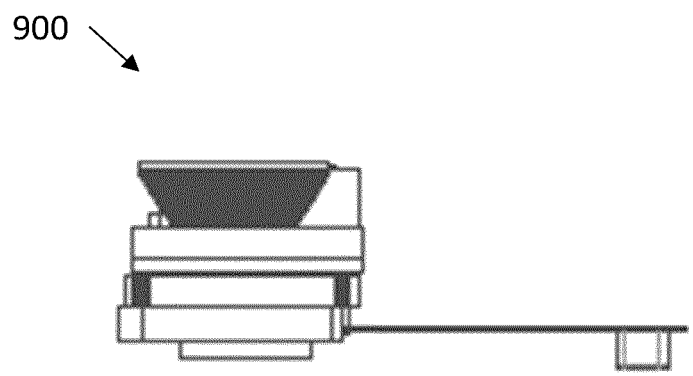
FIG. 11D is a schematic diagram of a fourth view of the third optical wireless communication system system-in-package layout.

FIG. 11D is a schematic diagram illustrating a fourth example view of the system-in-package layout.

In addition to the options detailed above, a single-side version of the PCB could be constructed. This would increase the footprint in both X and Y while reducing height.

An alternative to a SiP layout configuration comprising one or more PCBs may be a SiP layout configuration comprising a silicon integrated circuit, die or chip, optionally a multilayer silicon integrated circuit.

Some of the features of across the SiP layout options are described below.

Components

The PCB may be made of any suitable material, for example a National Electrical Manufacturers Association (NEMA) grade FR-4 material. FR-4 grading relates to high-pressure thermoset flame retardant (FR) glass-reinforced epoxy laminate material, for example a thin layer of copper foil laminated to one or both sides. Alternatively, the PCB material may be Flex, High Copper Weight, Hybrid Capable, Low/High Temp or Polyimide materials including Bismaleimide-Triazine (BT) substrate or co-fired ceramic such as a low temperature (LTCC) or high temperature (HTCC) cofired ceramic. The PCB may have embedded resistors and capacitors which are fired together with the PCB. Requirements for OWC PCB material and manufacture is understood to be similar to microwave PCB requirements.

Optionally, the package may be multilayer silicon integrated circuit, die or chip configuration instead of a PCB.

Optical shielding between the optical elements of the OWC device transmitter(s)/receiver(s) may be used to isolate the optical source(s) from the optical detector(s). In practise this may be achieved by putting walls around the emitter up to the top of the package. Shielding may be any enclosure or barrier which blocks the wavelength transmitted from the filter at the source. Shielding may be composed of any suitable material such as plastic, for example plastic with a black IR blocking coating or filling, or metal, for example anodised aluminium. Other infrared shielding doping options may include antimony-doped tin oxide (ATO) nanoparticles, tin-doped indium oxide (ITO), lanthanum hexabromide ($LaB_6$) and caesium tungsten oxide.

Electromagnetic (EM) shielding may also be used to protect the OWC device from external noise and to prevent the device from radiating too much. EM shielding may be composed of any suitable material, for example a metal, optionally sheet metal, metal screen or metal foam or a plastic with a metalised coating or epoxy filling to prevent signal leakage.

Both optical and EM shielding could be performed by the same material. Alternatively, two separate materials, optionally collocated, overlapping, or adjacent could perform optical shielding and EM shielding functions separately.

The whole SiP may be enclosed in a shielding can. Optical windows may be positioned in the shielding can as well as an aperture for the connectors, optionally a flex cable to be routed out.

The non-optical components (electronic components) can be encapsulated in an epoxy or silicone.

Detector(s)

A combination of the detectors, optics and filters in the OWC OFE receiver system described below may reduce the height required for the OWC OFE receiver system, for example from a total of 6 mm in the current state of the art unit to <2.5 mm.

Some current state of the art systems use low noise PIN detectors combined with optical concentrators which give optical gain. Due to the size constraints in the proposed system, there may in some embodiments be limited or no room for an optical concentrator and so the optical gain may be limited.

In addition, a requirement for high bandwidth of the OWC system may provide an upper limit on the size of the detector due to the trade-off between the size of the detector, the complexity of the analogue electronics, optionally an ASIC, and the bandwidth that can be achieved. High bandwidth may be considered greater than 200 MHz.

As performance of the OFE unit or system is dependent on the bandwidth and achieving that bandwidth in sufficient cross sectional area of the detector, it may be useful to define analogue bandwidth performance both by the size of active detection or detector area and the ratio of analogue bandwidth to active detector area.

For larger active detection areas of 2.5 $mm^2$ or greater, where the active area is the area of the detector reception region or combined/summed detector reception regions of the one or more detectors that produces a signal response, then a −3 dB analogue bandwidth to active detector area ratio range of 10 to 170 $Mhz/mm^2$ may be obtained in some embodiments. Also, to ensure that the noise contribution from and complexity of the TIA and subsequent analogue electronics in the receiver chain is low, internal gain may be required in the detector.

These factors lead to an embodiment described below.

The detectors, or detector, may comprise one or more optical elements such as avalanche photo diodes (APDs), silicon photomultipliers (SiPMs). APDs and SiPMs have the advantage of internal gain. For systems used for detection of two different wavelengths, for example wavelengths in the visible and IR spectra, filters may be used on the one or more optical elements. Filters are described below.

The detector may be a detector array, for example an APD array. Using a detector subdivided into smaller optical elements may increase the bandwidth achievable for the maximum detector area and simpler TIA and/or ASIC design. An array of smaller optical detector elements may lower the capacitance of the system compared to one large optical detector element. Outputs of the smaller optical detector elements may be summed together, obtaining the desired signal level and the required bandwidth while the receiver respects volume occupation requirements. A bandwidth of >300 MHz for a 4 element APD array with total area of 10 $mm^2$ may be possible. The subdivision may be much greater than 4 elements. For example, thousands of subdivisions may be achieved using elements such as SiPMs.

Concentrator(s) Concentrator optics may be included in some embodiments although concentrator optics may not necessarily be required in other embodiments. For example, a 1.1 mm high concentrator may give an optical gain of 1.85 for a 20° FoV beam. Alternatively, there may be no concentrator at all.

Figure 12:
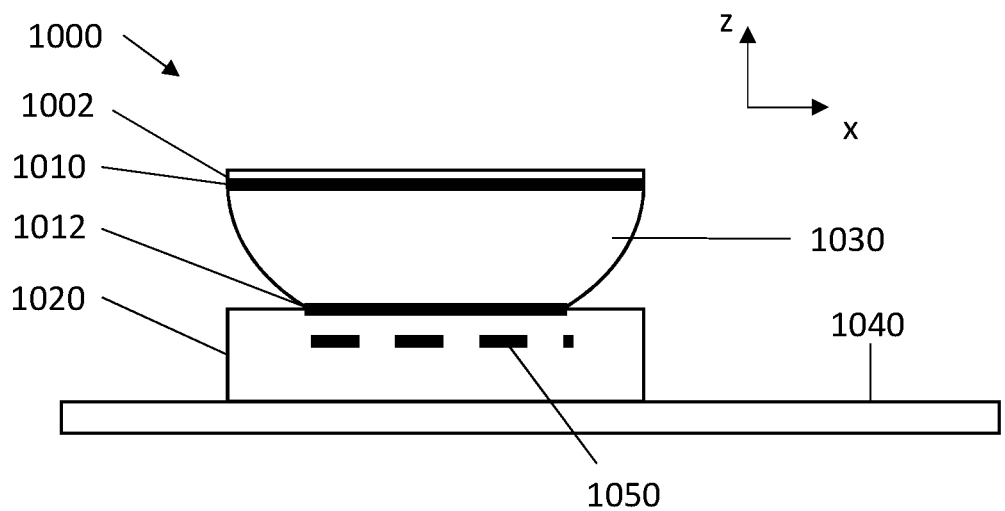
FIG. 12 is a schematic diagram of an optical wireless communication receiver architecture.

FIG. 12 shows a schematic of the proposed receiver architecture. The overall height may be <2.4 mm. with the height of the APD less than 1 mm. The distance from the photosensitive layer in the APD to the top of the concentrator may be 1.5 mm.

The APD, or other optical detector element, may be front or back illuminated. The mounting of the APD to the motherboard may be via wire bonding or flip-chip according to the layout of the device.

Using a flip-chip, or controlled collapse chip connection (C4) may reduce complexity when attaching the APD to the PCB.

In detail, FIG. 12 is a schematic diagram illustrating an example receiver architecture 1000. The receiver architecture 1000 comprises a long pass filter 1002, first epoxy layer 1010, second epoxy later 1012, avalanche photodiode on carrier 1020, photosensitive layer 1050, concentrator 1030, and printed circuit board 1040.

An upper surface of the printed circuit board 1040 is in contact with a lower surface of the avalanche photodiode on carrier 1020. An upper surface of the avalanche photodiode on carrier 1020 is in contact with a lower surface of the second epoxy layer 1012. An upper surface of the second epoxy layer 1012 is in contact with a lower surface of the concentrator 1030. An upper surface of the concentrator 1030 is in contact with a lower surface of the first epoxy layer 1010. An upper surface of the first epoxy layer 1010 is in contact with a lower surface of the long pass filter 1002. The photosensitive layer 1050 is within the avalanche photodiode on carrier 1020.

Cartesian axes are shown, where upper and lower surfaces are defined relative to a z-axis and lateral displacements are relative to an x-y plane.

Figure 13:
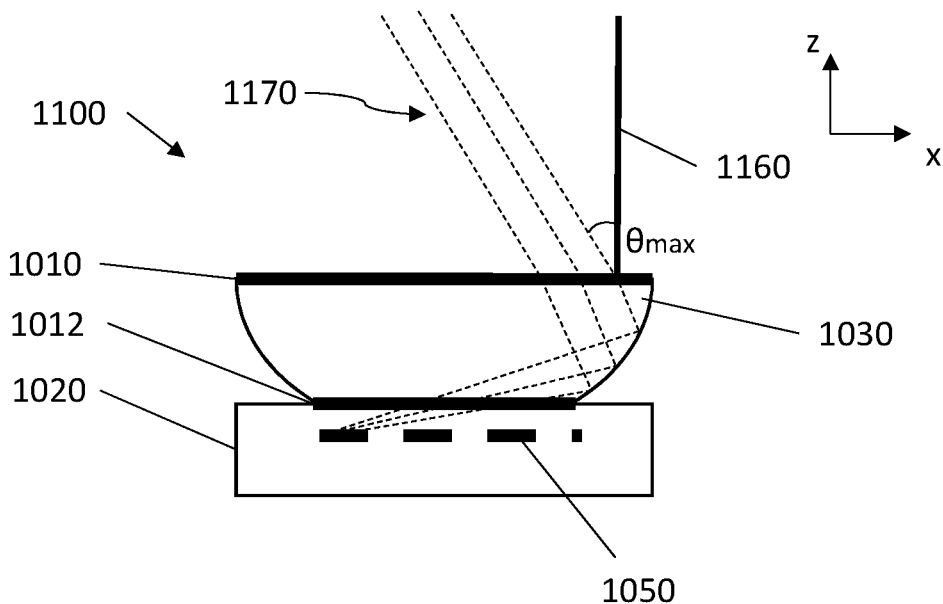
FIG. 13 is a schematic diagram of an optical wireless communication concentrator design.
Figure 14:
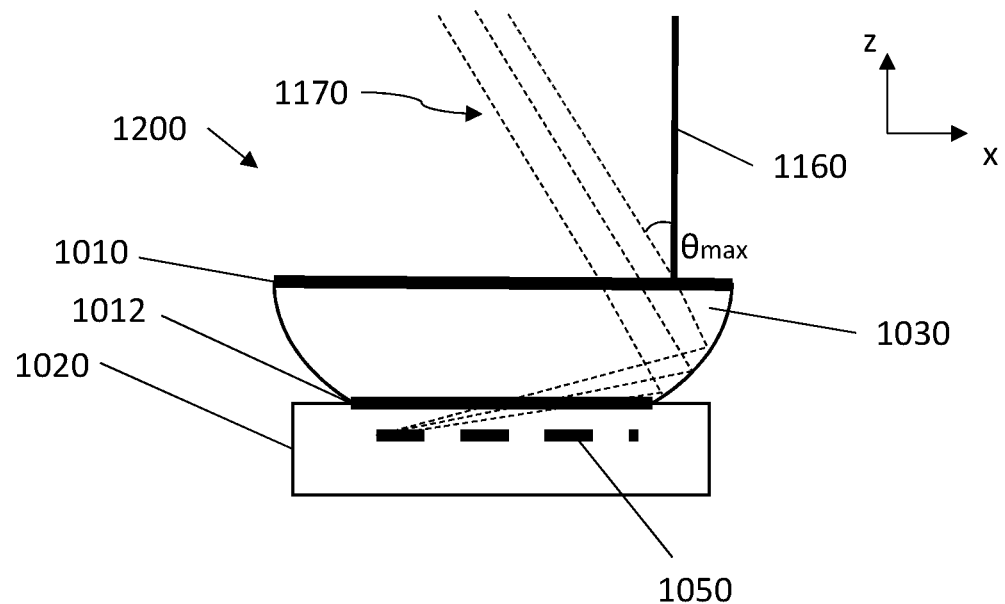
FIG. 14 is a schematic diagram of an optical wireless communication concentrator design where the concentrator is treated as if it starts from a photosensitive layer.

The design concept for the concentrator is shown in FIG. 13. The angle of the concentrator surface is selected so that either it is at the total internal reflection (TIR) angle or the light travels the route shown in FIG. 13. Light goes into the concentrator and is totally internally reflected from the wall of the concentrator. At the largest acceptance angle ($\theta_{max}$), the light is directed to the edge of the detector. Given that there is a layer of silicone and epoxy between the photosensitive layer and the base of the concentrator, the start position of the concentrator can be in a number of positions:

a) The aperture at the base may be the same size as the detector. This may give a smaller aperture at the top surface may not provide the best optical gain.

b) The concentrator can be treated as if it starts from the photodetector (see FIG. 14). This would effectively cut off a bottom fraction of the concentrator. However, this is the better approach for maximising optical gain if there is no restriction on the aperture size. In this case, an optical output aperture at the base of the concentrator has an area larger than an area of a detector reception region that produces a signal response and may be calculated or specified by the manufacturer of the detector. If the detector or detectors comprise more than one detector reception region, the area of the detector reception region may be an area defined by the smallest perimeter drawn around and encompassing all detector reception regions that produce a signal response.

Both approaches may be used in the same system, for example, one approach along one axis and another approach along another axis of the system.

TABLE 1

| Potential detection system specifications | |
|---|---|
| Bandwidth | High >200 MHz |
| Signal to Noise Ratio (SNR) | 25-30 dB |
| Area | 10 mm2 |
| Height | 1 mm |

In detail, FIG. 13 is a schematic diagram illustrating an example concentrator design concept 1100. The design concept 1100 comprises a first epoxy layer 1010, second epoxy layer 1012, avalanche photodiode on carrier 1020, photosensitive layer 1050, and concentrator 1030.

Light rays 1170 are shown at an incident angle of $\theta$ relative to a surface normal 1160. The light rays 1170 pass through the first epoxy layer 1010 into the concentrator 1030. The light rays 1170 then reflect from an inner surface of the concentrator 1030 and pass through the second epoxy layer 1012. The light rays 1170 then pass into the avalanche photodiode on carrier 1020 and are incident on the photosensitive layer 1050.

An upper surface of the avalanche photodiode on carrier 1020 is in contact with a lower surface of the second epoxy layer 1012. An upper surface of the second epoxy layer 1012 is in contact with a lower surface of the concentrator 1030. An upper surface of the concentrator 1030 is in contact with a lower surface of the first epoxy layer 1010. An upper surface of the first epoxy layer 1010 is in contact with a lower surface of the long pass filter 1002. The photosensitive layer 1050 is within the avalanche photodiode on carrier 1020.

Cartesian axes are shown, where upper and lower surfaces are defined relative to a z-axis and lateral displacements are relative to an x-y plane.

FIG. 14 is a schematic diagram illustrating an example concentrator design concept 1200. In particular, FIG. 14 shows a design concept for the concentrator where the concentrator is treated as it starts from the photosensitive layer. The design concept 1100 comprises a first epoxy layer 1010, second epoxy layer 1012, avalanche photodiode on carrier 1020, photosensitive layer 1050, and concentrator 1030.

Light rays 1170 are shown at an incident angle of $\theta$ relative to a surface normal 1160. The light rays 1170 pass through the first epoxy layer 1010 into the concentrator 1030. The light rays 1170 then reflect from an inner surface of the concentrator 1030 and pass through the second epoxy layer 1012. The light rays 1170 then pass into the avalanche photodiode on carrier 1020 and are incident on the photosensitive layer 1050.

An upper surface of the avalanche photodiode on carrier 1020 is in contact with a lower surface of the second epoxy layer 1012. An upper surface of the second epoxy layer 1012 is in contact with a lower surface of the concentrator 1030. An upper surface of the concentrator 1030 is in contact with a lower surface of the first epoxy layer 1010. An upper surface of the first epoxy layer 1010 is in contact with a lower surface of the long pass filter 1002. The photosensitive layer 1050 is within the avalanche photodiode on carrier 1020.

Cartesian axes are shown, where upper and lower surfaces are defined relative to a z-axis and lateral displacements are relative to an x-y plane.

Detector Filters

Bandpass filters may be required in OWC device receiver systems to provide wavelength discrimination. A current state of the art system uses an ion-doped filter but this is an absorption filter and requires a thickness of at least 0.5 mm to be effective. Alternatives may include using thin film filters. There may be issues with angular sensitivity summarised below, but these can be overcome. The filter may either be applied directly to the detector, to the concentrator or to a thin substrate. For example, the thin substrate may be 50-250 µm in thickness. If the filter is applied directly to the detector or concentrator, this reduces the height required for them.

Figure 15:
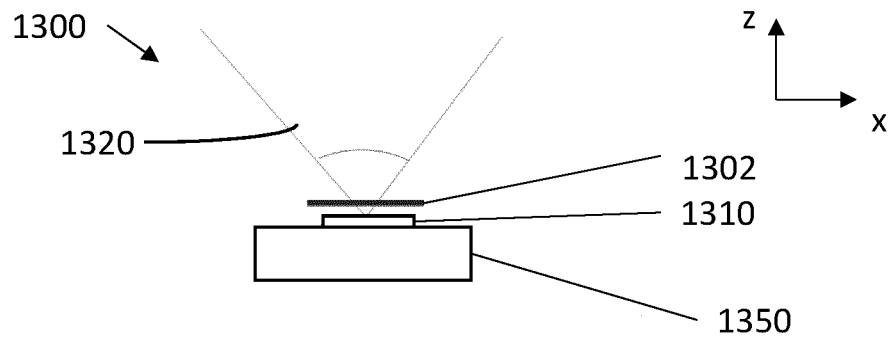
FIG. 15 is a schematic diagram of an optical wireless communication system including a bandpass filter.

The filter(s) may be positioned in front of the photodetector to filter light being received by the OWC device receiver. FIG. 15 includes a schematic of a bandpass filter.

FIG. 15 is a schematic diagram illustrating an example optical wireless communication device 1300 including a bandpass filter.

The device 1300 comprises a substrate 1350, detector, 1310, and bandpass filter 1302. The device 1300 exhibits a field of view 1320. An upper surface of the substrate 1350 is in contact with a lower surface of the detector 1310. A bandpass filter 1302 is arranged above the detector 1310, such that light incident on the detector 1310 passes through the bandpass filter 1302 first.

Cartesian axes are shown, where upper and lower surfaces are defined relative to a z-axis and lateral displacements are relative to an x-y plane. Above is defined relative to a z-axis.

Using a filter on a separate substrate may have advantages for cost and assembly of the unit:
a) Depositing the coating directly onto the detector may mean that there are potentially issues with wirebonding and yield of the detectors as the coating may be applied late in the process;
b) Using bandpass filters applied to a substrate and/or the concentrator may mean that large areas can be coated and then diced and attached using standard pick and place techniques during the package assembly;

Although plasmonic filters are not yet a mature technology, plasmonic filters may be an option for a filter due to their angle independence.

Filter combinations may include dual-wavelength filters, separate bandpass filters, shortpass or longpass filter(s).

Different filters, or a single multiple wavelength filter such as a dual-wavelength filter (also referred to as a dual-band filter, notch filter, band-stop filter or rejection filter), on the one or more receivers may allow transmission of different wavelengths or range of wavelengths. For example, a first wavelength or range of wavelengths may be in the visible spectrum and a second wavelength or range of wavelengths may be in the infrared spectrum. The first wavelength and second wavelength may both be in the infrared spectrum.

Use of one or more dual-wavelength filters may reduce the total number of APDs required where there may be slow speed OWC via a first wavelength, for example in the visible spectrum or high speed OWC via a second wavelength, for example in the infrared spectrum.

The dual-wavelength filter may be configured to transmit light at around 450 nm and around 860 nm wavelengths while blocking light at other frequencies. In particular, the filter may block light at frequencies between around 450 nm and around 860 nm, including the around 800 nm wavelength that may be used for uplink transmission from the STA, or mobile device, to the AP. The filter may allow through an amount of around 450 nm and around 860 nm light which may be sufficient for OWC but would have low transmission at around 800 nm.

Figure 16:
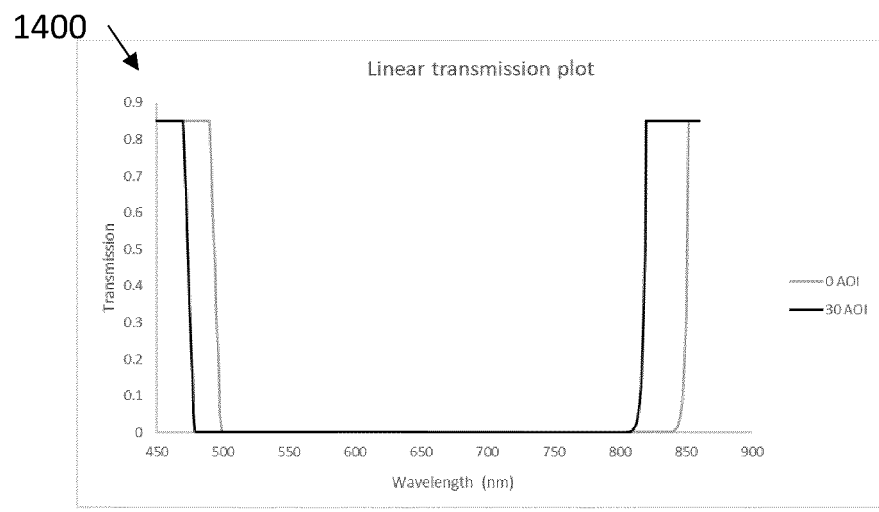
FIG. 16 is a plot of transmissivity against wavelength for a dual wavelength thin film filter.
Figure 17:
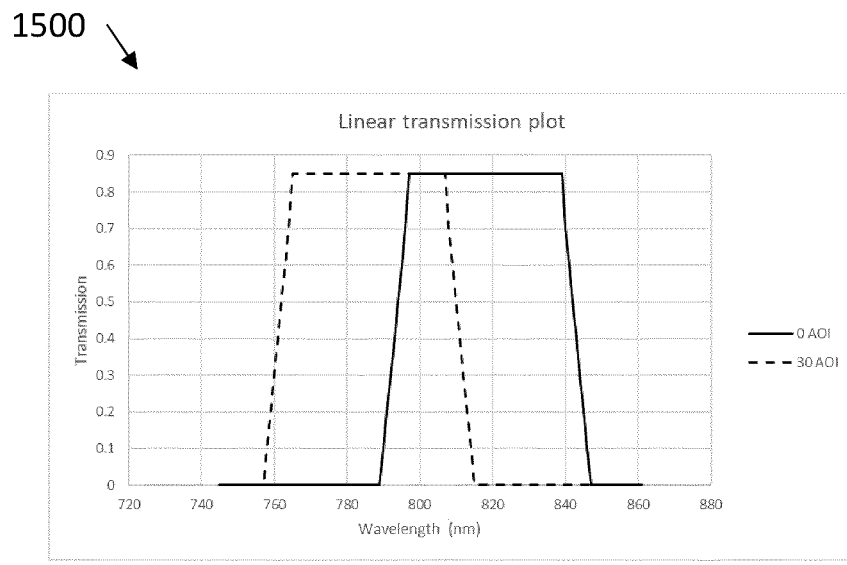
FIG. 17 is a plot of transmissivity against wavelength for a thin film filter to use in three wavelength operation.
Figure 18:
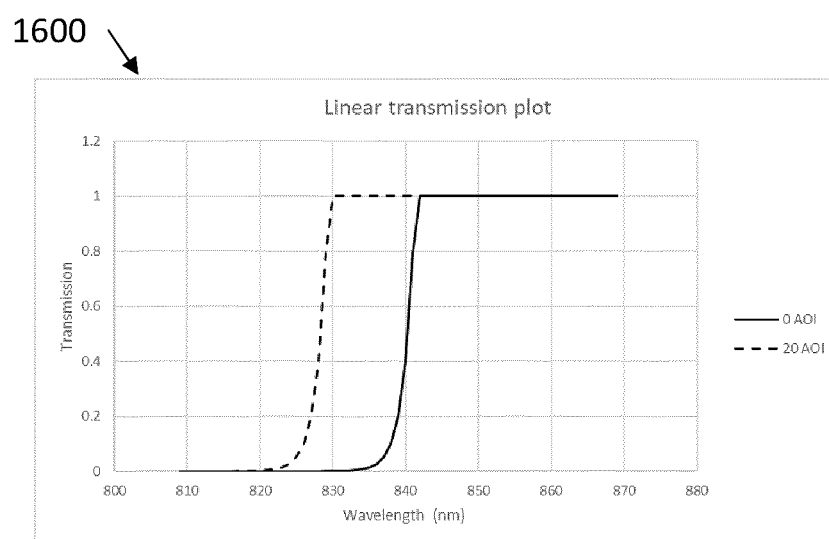
FIG. 18 is a plot of transmissivity against wavelength for a long pass thin film filter.

If the system comprises one or more thin film filter, the thin film filter may comprise a coat glass wafer mounted onto the casing of the OWC device receiver apparatus package providing an air to glass interface at both surfaces. The thin film filter may control reflectivity by building up a series of layers of different refractive indices on a substrate. By the nature of the process by which light is reflected, thin film filters may be angle sensitive. In particular, the band edges (between high and low reflectivity) may move with angle. At wavelengths of around 800 nm, the band edge may move by around 30 nm (or 3% to 4%) for an angular shift of 30°. At wavelengths of around 450 nm, the band edge may move by around 20 nm (or 3% to 4%) for the same angular shift. Therefore, a thin film filter which has a band edge at around 850 nm may shift to around 820 nm as the angle increases from on axis (0° angle of incidence) to off axis (30° angle of incidence). FIG. 16 shows such a shift for a dual wavelength filter. FIG. 17 shows such a shift for a bandpass filter. FIG. 18 shows such a shift for a long pass filter. FIG. 16 and FIG. 17 are plots of transmissivity versus wavelength, with lines representing the transmission profile of light at an angles of incidence of 0° and 30°. As shown in FIG. 16, the dual wavelength thin film filter will always block light at 800 nm and will always pass light at 860 nm. As shown in FIG. 17, the bandpass thin film filter will always pass light at 800 nm.

In a separate case for D2D communication with a narrower field of view a long pass filter can be used as shown in FIG. 18. the long pass thin film filter always pass light above 850 nm, blocking out ambient light of other wavelengths. A combination of dual wavelength, bandpass and/or long pass filters may be used in the system. The thin film filters may minimise the amount of background light from the visible part of the spectrum not used for OWC.

FIG. 16 shows a plot 1400 of linear transmission on the y-axis against wavelength. Data for an angle of incidence of 0 degrees is shown alongside data for an angle of incidence of 30 degrees. The data for the 0 degree angle of incidence is shown displaced to the right (e.g. to longer wavelengths) relative to the data for the 30 degree angle of incidence.

FIG. 17 shows a plot 1500 of linear transmission on the y-axis against wavelength on the x-axis. Data for an angle of incidence of 0 degrees is shown alongside data for an angle of incidence of 30 degrees. The data for the 0 degree angle of incidence is shown displaced to the right (e.g. to longer wavelengths) relative to the data for the 30 degree angle of incidence.

FIG. 18 shows a plot 1600 of linear transmission on the y-axis against wavelength. Data for an angle of incidence of 0 degrees is shown alongside data for an angle of incidence of 30 degrees.

The data for the 0 degree angle of incidence is shown displaced to the right (e.g. to longer wavelengths) relative to the data for the 30 degree angle of incidence.

Transmitter

The height available for the transmitter in the proposed OWC device may be governed by the height constraints of the receiver, which are more rigorous to limit the complexity of the analogue electronics while maintaining bandwidth.

Most typical state of the art OWC systems use LEDs as the optoelectronic light source for OWC transmission, but these are bandwidth limited. For low speed OWC systems an LED can be used which is typically limited to a bandwidth of 20-30 MHz without compensation. For high speed OWC systems, lasers or light-emitting plasmas are preferred. Laser light sources may include vertical cavity surface-emitting lasers (VCSELs), VCSEL arrays or laser diodes, including side emitter laser diodes. Laser light sources have bandwidths of >1 GHz, meaning that the laser light source is not the primary limiting constraint on bandwidth in a state of the art OWC system comprising a laser light source.

While laser light sources have a high bandwidth, there are some constraints and disadvantages when using laser light sources for OWC transmission, for example eye safety and speckle.

The main constraint in the design of the proposed transmitter using a laser light source is ensuring the OWC device is eye safe during use over an extended period of time at a typical usage distance for handheld device.

The standards for laser safety have evolved over the years. Initially this was carried out as more information became available and new applications were developed. In 2001 there was a complete updating of all the regulations into the Laser safety standard IEC-60825. Since then there have been a number of updates, the most recent in 2014. However, there are still some use cases that still refer back to the 2001 standard. In the following section, it is assumed that IEC 60825-12 which describes free space optical communications applies to OWC operation. The measurement and characterisation of laser sources is described in IEC 60825-1.

TABLE 2 exposure limits for Class 1 laser operation

| Timescale | Emission limit |
| --- | --- |
| <10 ps | $3.8 \times 10^{-8}$ J |
| 10 ps to 5 ms | $7.7 \times 10^{-8} C_4$ J |
| 5 ms to 10 s | $7 \times 10^{-4} t^{0.75} C_4$ J |
| >10 s | $3.9 \times 10^{-4} C_4 C_7$ W |

Figure 19:
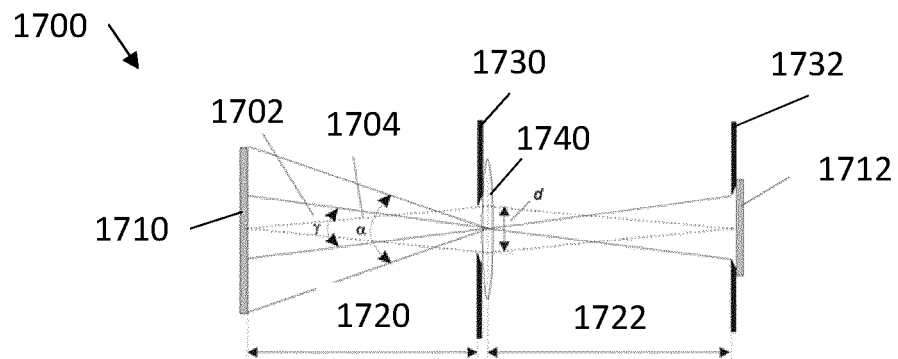
FIG. 19 is a schematic diagram of a laser-safety metrology system for optical wireless communication.

Table 2 exposure limits are based on the amount of light collected from a point source by a 7 mm aperture, for example a pupil, positioned 100 mm from the apparent source as shown in FIG. 19.

FIG. 19 is a schematic diagram illustrating a metrology apparatus 1700 for determining radiance and time integrated radiance, and shows a measurement condition for laser safety.

The metrology apparatus 1700 comprises an apparent source 1710, circular aperture stop 1730, lens 1740, circular field stop 1732, and an active area of a detector 1712. A distance between the apparent source 1710 and the circular aperture stop 1730 is a measuring distance r 1720. A distance between the circular aperture stop 1730 and the circular field stop 1732 is an image distance 1722.

Light from the apparent source 1710 that is able to pass through the circular aperture stop 1730 and lens 1740 and pass through the circular field stop 1732 into the active area of the detector 1712 exhibits an angle of acceptance γ 1702. Light from the apparent source 1710 incident on the lens exhibits an angular subtense of the apparent source a 1704.

The diameter of the circular aperture stop 1730 is d.

The constants C4 and C7 vary with wavelength band and for the near infrared (NIR) region around 850 nm are shown in Table 3 Constants C4 and C7 at 850 nm:

TABLE 3

Constants C4 and C7 at 850 nm

| Parameter | Formula | Value |
| --- | --- | --- |
| Wavelength | | 850 nm |
| $C_4$ | 100.002(λ-700) | 1.995 |
| $C_7$ | 1 | 1 |

Using a diffuser, the effective size of a laser source can be increased. Extended sources as defined within the laser standard where the angle subtended by the source in FIG. 19 is α and α>$α_{min}$. For a 1 mm source area at a distance of 100 mm, α=10 mrad. As $α_{min}$ is 1.5 mrad, α>$α_{min}$ and the source is classified as an extended source. This means that the emission limits are increased by a factor of $C_6$ where $C_6$ is:

$$C_6 = \frac{\alpha}{\alpha_{min}} \quad \alpha_{min} < \alpha < \alpha_{max}$$

$$C_6 = \frac{\alpha_{max}}{\alpha_{min}} \quad \alpha > \alpha_{max}$$

TABLE 4

$α_{max}$ varies with timescale, and therefore so does $C_6$

| Timescale | <625 μs | 625 μs ≤ t ≤ 0.25 s | >0.25 s |
| --- | --- | --- | --- |
| $α_{max}$ | 5 | $200t^{0.5}$ | 100 |
| C6 | 3.3333 | | 6.667 |

Using the values in Table 2 and Table 3, for a point source laser beam of 850 nm, the eye safety limit under the eye safety standard IEC 60825-1 for long exposure is 0.8 mW passing through a 7 mm aperture 100 mm away from the point source. However, the amount of power can be increased by increasing the apparent source size up to a maximum size of 10 mm. An apparent source, also known as an effective source or a secondary source, is a real or virtual object that forms the smallest possible retinal image of a retinal hazard at a given evaluation location, for example the aperture. For example, with an apparent source size of 1 mm, the eye safety limit increases to 2.6 mW. For example, with an emission level of 200 mW from an apparent source of 1 mm in size and an emission cone angle of 60°, the amount of light collected through the 7 mm aperture at 100 mm is 0.5 mW. This is 5× below the eye safety limit threshold of 2.6 mW, which is an acceptable margin. To achieve this, light from point source(s), such as a VCSEL array, is propagated a distance of 0.7 mm from an array to give a spot size of 1 mm at a diffuser. The VCSEL array may be an array of 25 VCSEL mesas on a 5×5 array which keeps the threshold current low but still in the linear regime. In the absence of the diffuser, the apparent source size is the size of the VCSELs and therefore a point source. However, adding a diffuser increases the divergence angle of the beam which means that the apparent source size increases to the spot size at the diffuser. It therefore also increases the cone angle of the beam for example from 15° to 60° (combined APSTA and D2D) or from 15° to 20° (D2D).

A diffuser may be configured to minimise the distance between an outer surface of the or each emitter and an outer surface of the diffuser.

Figure 20:
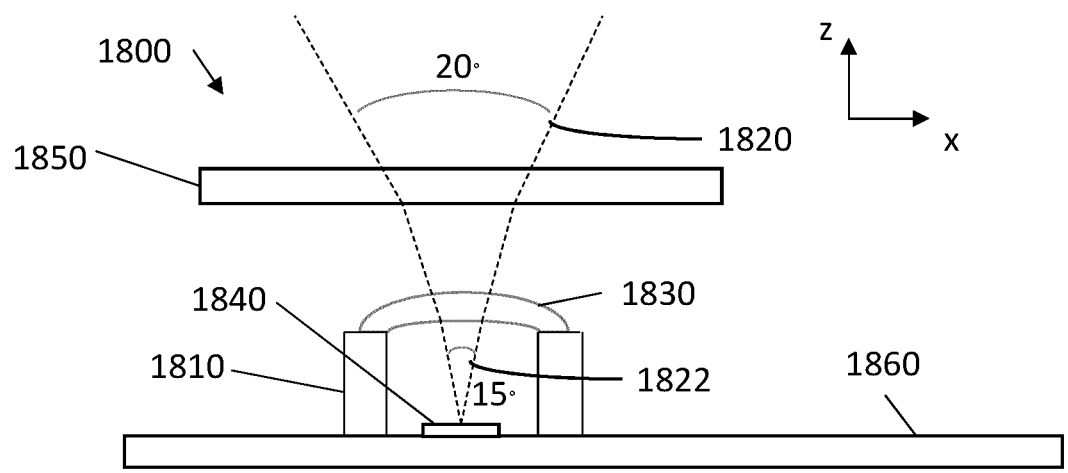
FIG. 20 is a schematic diagram of a non-imaging microoptic and diffuser increasing the output angle of a vertical cavity surface emitting laser array.

An alternative way to reduce the distance between the VCSEL and the diffuser is to add a microoptic between the VCSEL and the diffuser as in FIG. 20. FIG. 20 shows a non-imaging microoptic and diffuser increasing output angle of VCSEL array.

The apparent source size is still the spot size on the diffuser but this is generated over a shorter distance using the micro-optic. For example, in the D2D system, to generate a 1.2 mm spot at the diffuser (required for eye safety), a VCSEL array may be used spaced over a 1×1 mm area on the semiconductor die. Alternatively, a micro-optic with a height of 1.1 mm may be added which reduces the required emissive area for the VCSELs to 0.6×0.6 mm which roughly doubles the amount of VCSELs that can be obtained from a single wafer and therefore halves the cost. The microoptic may be a non-imaging microoptic element, for example a lens. The microoptic and/or the VCSEL may be mounted directly onto the PCB or a carrier.

In detail, FIG. 20 is a schematic diagram illustrating a device 1800 including a non-imaging microoptic 1830 and diffuser 1850 that increases the output angle of a vertical cavity surface emitting laser array.

The device 1800 comprises a printed circuit board 1860, microoptic carrier 1810, vertical cavity surface emitting laser array 1840, non-imaging microoptic 1830, and diffuser 1850.

A first field of view 1822 is shown of light from the vertical cavity surface emitting laser with an angular field of view of 15 degrees. The non-imaging microoptic does not alter the first field of view 1822.

A second field of view 1820 is shown of light from the diffuser with an angular field of view of 20 degrees. The second field of view is larger than the first field of view.

An upper surface of the printed circuit board 1860 is in contact with a lower surface of the microoptic carrier 1810 and vertical cavity surface emitting laser array 1840. An upper surface of the microoptic carrier 1810 is in contact with a lower surface of the non-imaging microoptic 1830. Above the non-imaging microoptic 1830 is the diffuser 1850, such that light emitted from the vertical cavity surface emitting laser 1840 passes through the non-imaging microoptic 1830 then out of the diffuser 1850.

Cartesian axes are shown, where upper and lower surfaces are defined relative to a z-axis and lateral displacements are relative to an x-y plane.

With regard to speckle, a speckle pattern is generated in the far field by a diffuser when using a laser light source in the proposed OWC device. As the source wavelength is in the near infrared (800-850 nm), this does not cause an issue for the eye viewing the light but may affect the performance of the OWC device. The contrast of the speckles may be reduced by two factors: use of an array of light sources, for example a VCSEL array; and design of the diffuser. Design of diffuser to minimise contrast may include using a specific microstructure to increase the beam divergence and also minimise contrast on the speckle.

Analogue Chip

There are a number of electronic functions that may need to be carried out by the at least one analogue chip acting as the interface between a baseband chip or an RF interface and the OWC light source and/or detector. The following functions may be carried out by the ASIC:

Provision of a linear current source, ideally substantially linear, to drive the light source, optionally at least one LED or laser light source;

Amplification of detector signal output, for example via TIAs, from each of the at least one elements of the detector, and optionally a summer to combine the signals in the case where there is more than one signal;

Signal level adjustment from the receiver, optionally to a constant level, to go into the ADC input to the baseband, for example via one or more AGC such as a VGA;

Filtering out high frequency noise, for example by using a low pass filter;

Checking and maintaining signal level, for example by using feedback loops, clocks and/or comparators;

Converting to the appropriate voltage for components such as detectors, for example APDs, for example via high voltage converters;

A single ASIC may perform signal conditioning functions and high voltage conversion functions of the OWC OFE system. Alternatively, the high voltage conversion may require a different processing node, and so a second chip may be required. The current driver, TIAs and other components of the receiver chain may all be carried out by the first ASIC.

A custom ASIC to fulfil the above functions have a footprint less than 4×4×0.3 mm. Likewise, the high voltage converter may have a similar height and an area of around 2×2 mm.

An alternative approach would be to have a separate chip for the TIAs and carry out the analogue processing on a dedicated ASIC.

Another alternative approach is to use a TIA without an ASIC. This would be a simplified approach with less control available.

The OWC system may not comprise an ASIC, but instead comprise at least one detector and/or light source with external components to perform the above functions.

Track configuration avoids or limits interference between RX and TX components.

Electrical connections between layers of a double sided or multilayer PCB, or a stack of PCBs are achieved using vias, optionally microvias, buried vias and/or blind vias.

External components such as inductors, resistors, capacitors, diodes, transistors and switches may be required. The resistors and most of the capacitors can be small, for example 0402 or 0201 components, whereas the inductors need to be relatively large, for example 1008 or 0805 components. These components may be as tall as 1-1.45 mm.

The OFE OWC system may be connected to the rest of the OWC electronics, for example baseband electronics using a flex circuitry and/or landgrid array.

The system as a whole may have some or all non-essential components removed and the remaining components packed into as small a package as possible, while still:

Eye safe (relatively) high performing

With (relatively) low power consumption

There may be provided one or more, or all, of the following in any desired combination:

Each option has everything packaged into a SiP:

At least one PCB or integrated Si

Single layer-large area and low height (optionally with components stacked as in Option 1)

Stacked—to reduce footprint at the expenses of increasing the height

On dual sided PCB (top and bottom) to reduce footprint
□ TX and RX optically isolated ○ Detector, optimised comprising:

Segmented detector with internal gain, optionally an APD or SiPM [gets the bandwidth of the detector]

(Optional) Low profile concentrator [And small optical gain]
Non-imaging
(Optional) filter
bandpass
Angle independent
Thin film (substrate <50 μm)
Plasmonic
Dual wavelength
Optionally Directly coated onto detector and/or concentrator
Transmitter, optimised comprising:
Laser
  optionally matrix emitter array,
  optionally VCSEL array [gets speed up while keeping current low]
Transmitting optic, optionally a Diffuser, to create an apparent source [to be eye safe and small]
'telescope' lens to reduce area required of the VCSEL so you get the same power in the same area, so it costs less.
Microoptic
Analogue electronics,
optionally ASIC [gets even smaller]
  For conditioning of TX and RX signals containing TIAs, (substantially) linear driver, amplifiers, and low pass filters
  Optionally high voltage converter
  External passive components as required.
  TIAs may be either stand-alone components or part of the analogue electronics if required (probably not needed for SiPMs)
Combining with baseband chip, optionally RF baseband chip, optionally MIMO baseband chip.

It will be understood that the present invention has been described above purely by way of example, and modifications of detail can be made within the scope of the invention. Each feature disclosed in the description, and (where appropriate) the claims and drawings may be provided independently or in any appropriate combination.

The invention claimed is:

1. An optical wireless communication (OWC) unit installable in an electronic device and configured to transmit and/or receive data and comprising:
at least one transmitter device configured to transmit modulated light comprising an optical wireless communication signal of said data, and/or at least one receiver device configured to receive modulated light comprising an optical wireless communication signal representative of said data,
wherein the at least one receiver device comprises at least one detector,
wherein the at least one detector is configured to receive modulated light comprising optical wireless communication signals and is configured to generate electrical signals corresponding to the modulated light comprising optical wireless communication signals,
wherein the OWC unit further comprises:
analog electronic circuitry configured to process the electrical signals generated by said at least one detector and/or the electrical signals to be provided to said at least one transmitter device; and
at least one power connection and/or at least one data connection for connection to a power source and/or processing circuitry of the electronic device, the OWC unit being configured such that it is operable to provide OWC under control of said electronic device and/or so as to receive data from/provide data to said electronic device, when said power connection and/or said data connection are connected to said power source and/or said processing circuitry, and
wherein the OWC unit is for use in an optical wireless communication system having an analogue bandwidth greater than or equal to 80 MHz, and
wherein a ratio of OWC unit performance bandwidth to active receiver area is between 10 MHz/mm$^2$ and 170 MHz/mm$^2$.

2. The OWC unit according to claim 1, further comprising power electronics and control electronics.

3. The OWC unit according to claim 1, further comprising a current source, voltage generation circuitry, and a controller for controlling operation of the at least one transmitter device and/or the at least one receiver device.

4. The OWC unit according to claim 1, wherein the OWC unit has a maximum height of less than or equal to 10 mm and/or the OWC unit has a maximum length of less than or equal to 10 mm and/or the OWC unit has a maximum width of less than or equal to 10 mm.

5. The OWC unit according to claim 1, wherein the OWC unit comprises a circuit carrier structure, or a plurality of circuit carrier structures.

6. The OWC unit according to claim 5,
wherein the at least one receiver device is arranged in a stacked arrangement with one or more further components, and
wherein the stacked arrangement is such that said one or more further components are beneath the at least one receiver device and above the circuit carrier structure, or at least one of the circuit carrier structures, on which they are provided.

7. The OWC unit according to claim 1, wherein the at least one receiver device comprises at least one concentrator.

8. The OWC unit according to claim 1,
wherein the at least one transmitter device comprises at least one emitter and at least one of a light collector, a light filter, a light focusing element, a defocusing element or a light concentrator arranged above the at least one emitter.

9. The OWC unit according to claim 8, wherein the at least one transmitter device comprises at least one microoptic element and/or at least one diffuser.

10. The OWC unit according to claim 1, further comprising at least one thin-film filter.

11. The OWC unit according to claim 1,
wherein the OWC unit comprises, or is configured to connect to, conditioning circuitry configured to receive at least one signal and process the at least one signal to produce at least one conditioned signal representative of data streams and suitable for transmission using the at least one transmitter device, and
wherein the at least one signal is received from a baseband device.

12. The OWC unit according to claim 11, further comprising, or configured to connect to, further conditioning circuitry configured to receive signals from the at least one receiver device and process the signals to produce at least one conditioned signal representative of data streams.

13. The OWC unit according to claim 11,
wherein the conditioning circuitry or further conditioning circuitry is configured to perform at least one frequency conversion process, or
wherein the at least one frequency conversion process comprises a plurality of frequency conversion processes.

14. The OWC unit according to claim 5, wherein at least one of the circuit carrier structures comprises a double-sided circuit carrier structure or multi-layer circuit carrier structure.

15. The OWC unit according to claim 7, wherein the at least one concentrator has an optical output aperture having an area greater than an area of at least one detector reception region of the at least one detector.

16. The OWC unit according to claim 1, wherein a combined aperture area of the at least one transmitter device and/or the at least one receiver device is an area that represents at least 50% of a cross-sectional area of the OWC unit as measured in a plane of an aperture of the at least one transmitter device and/or the at least one receiver device and orthogonal to a direction of transmission or reception.

17. The OWC unit according to claim 1, wherein a direction or average direction of transmission from the at least one transmitter device, or a direction or average direction of reception of the at least one receiver device, is substantially parallel to a plane formed through a surface or axis of symmetry of the electronic device.

18. The OWC unit according to claim 1, configured to provide optical wireless communication at a data transfer rate of up to 1.5 Gbps over a free space operational distance of greater than 1 m when provided with the optical wireless communication signals.

19. An optical wireless communication (OWC) unit installable in an electronic device and configured to transmit and receive data, the OWC unit comprising;
at least one transmitter device for transmitting modulated light comprising an optical wireless communication signal of said data and at least one receiver device for receiving modulated light comprising an optical wireless communication signal representative of said data, wherein the at least one receiver device comprises at least one detector, wherein the at least one detector is configured to receive modulated light comprising optical wireless communication signals and to generate electrical signals corresponding to the modulated light comprising optical wireless communication signals;
the OWC unit further comprising:
analog electronic circuitry for processing the electrical signals generated by said at least one detector; and
at least one power connection and/or at least one data connection for connection to a power source and/or processing circuitry of the electronic device, the OWC unit being configured such that it is operable to provide OWC communication under control of said electronic device and/or so as to transmit data from/provide data to said electronic device, when said power connection and/or said data connection are connected to said power source and/or said processing circuitry via the at least one power connection and/or at least one data connection,
wherein a ratio of performance bandwidth of the OWC unit to active receiver area is between 10 MHz/mm$^2$ and 170 MHz/mm$^2$.

20. The OWC unit according to claim 19, further comprising power and control electronics configured to provide voltage, current and control requirements for operation of the OWC unit.

21. The OWC unit according to claim 19, wherein the OWC unit has a maximum height of less than or equal to 10 mm and/or the OWC unit has a maximum length of less than or equal to 10 mm and/or the OWC unit has a maximum width of less than or equal to 10 mm.

22. The OWC unit according to claim 19, wherein a direction or average direction of transmission from the at least one transmitter device, or a direction or average direction of reception of the at least one receiver device, is substantially parallel to a plane formed through a surface or axis of symmetry of the electronic device.

23. The OWC unit according claim 19, wherein the at least one receiver device comprises at least one concentrator, wherein the at least one concentrator has an optical output aperture having an area greater than an area of at least one detector reception region of the at least one detector.

24. The OWC unit according to claim 19, wherein at least part of the analog electronic circuitry is incorporated into an application-specific integrated circuit (ASIC).

* * * * *